(12) United States Patent
Lei et al.

(10) Patent No.: US 9,614,599 B2
(45) Date of Patent: Apr. 4, 2017

(54) METHOD FOR DETERMINING PRECODING MATRIXES FOR COMMUNICATION AND A SYSTEM THEREFROM

(71) Applicant: Agency for Science, Technology and Research, Singapore (SG)

(72) Inventors: Zhongding Lei, Singapore (SG); Po Shin Francois Chin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 182 days.

(21) Appl. No.: 13/958,210

(22) Filed: Aug. 2, 2013

(65) Prior Publication Data

US 2014/0036815 A1 Feb. 6, 2014

(30) Foreign Application Priority Data

Aug. 3, 2012 (SG) .............................. 201205782-4

(51) Int. Cl.
*H04W 4/00* (2009.01)
*H04B 7/0456* (2017.01)
*H04B 7/024* (2017.01)

(52) U.S. Cl.
CPC ........... *H04B 7/0456* (2013.01); *H04B 7/024* (2013.01)

(58) Field of Classification Search
CPC .................................................. H04B 7/0456
USPC ....................................................... 370/329
See application file for complete search history.

(56) References Cited

U.S. PATENT DOCUMENTS

| | | | | |
|---|---|---|---|---|
| 8,488,480 B2* | 7/2013 | Han | ..................... | H04B 7/0417 370/252 |
| 8,711,774 B2* | 4/2014 | Tamaki | ................ | H04B 7/0417 370/208 |
| 8,768,261 B2* | 7/2014 | Tong | ................... | H04W 52/243 455/226.1 |
| 8,797,959 B2* | 8/2014 | Razaviyayn et al. | ......... | 370/328 |

(Continued)

FOREIGN PATENT DOCUMENTS

| | | |
|---|---|---|
| WO | 2011085694 | 7/2011 |
| WO | 2011140938 | 11/2011 |

OTHER PUBLICATIONS

Syed A. Jafar, "Degrees of Freedom Region of the MIMO X Channel," IEEE Transactions on Information Theory, vol. 54, No. 1, Jan. 2008, pp. 151-170.

(Continued)

*Primary Examiner* — Guang Li
(74) *Attorney, Agent, or Firm* — Conley Rose, P.C.

(57) ABSTRACT

In various embodiments of the present disclosure, there is provided a method for determining precoding matrixes for a communication of a first base station and a second base station with a first mobile station and a second mobile station. Precoding matrixes for a plurality of signal channels between the base stations and the mobile stations are determined based on a signal to noise ratio (SNR) consideration. Accordingly, the method can include determining a first set of precoding matrixes based on a predetermined consideration of SNR between the first base station and the second base station and the first mobile station and the second mobile station and generating a second set of precoding matrixes based on the first set of precoding matrixes. A corresponding system for carrying out a determination of precoding matrixes is provided.

18 Claims, 6 Drawing Sheets

(56) References Cited

U.S. PATENT DOCUMENTS

| | | | |
|---|---|---|---|
| 9,083,479 B2* | 7/2015 | Etemad | H04W 76/048 |
| 9,184,813 B2* | 11/2015 | Bazzi | H04L 25/03343 |
| 2008/0188259 A1* | 8/2008 | Blanz et al. | 455/522 |
| 2009/0181708 A1* | 7/2009 | Kim | H04B 7/024 455/501 |
| 2009/0325591 A1* | 12/2009 | Liu | H04J 11/005 455/452.2 |
| 2010/0002643 A1 | 1/2010 | Han et al. | |
| 2010/0034146 A1 | 2/2010 | Hou et al. | |
| 2010/0227613 A1* | 9/2010 | Kim | H04L 25/03828 455/434 |
| 2011/0009125 A1* | 1/2011 | Shin | H04B 7/024 455/452.1 |
| 2011/0055653 A1* | 3/2011 | Shirani-Mehr et al. | 714/749 |
| 2011/0059765 A1* | 3/2011 | Kim | H04B 7/024 455/550.1 |
| 2011/0177834 A1* | 7/2011 | Shin | H04J 11/0033 455/501 |
| 2012/0014468 A1* | 1/2012 | Wu et al. | 375/260 |
| 2012/0082259 A1* | 4/2012 | Yue | H04L 25/03343 375/285 |
| 2012/0114028 A1* | 5/2012 | Davydov | H04B 7/024 375/224 |
| 2012/0121034 A1* | 5/2012 | Murakami et al. | 375/295 |
| 2012/0163433 A1* | 6/2012 | Koike-Akino | H04W 28/048 375/220 |
| 2012/0176978 A1 | 7/2012 | Kim | |
| 2012/0281780 A1* | 11/2012 | Huang | H04B 7/0452 375/267 |
| 2012/0302280 A1* | 11/2012 | Seo | H04B 7/0417 455/522 |
| 2012/0314808 A1* | 12/2012 | Taoka | H04B 7/0452 375/299 |
| 2013/0107920 A1* | 5/2013 | Kim et al. | 375/219 |
| 2013/0267266 A1* | 10/2013 | Park | H04B 7/0456 455/501 |
| 2013/0301746 A1* | 11/2013 | Mobasher | H04B 7/0456 375/267 |

OTHER PUBLICATIONS

Shen et al, "Precoding Design Using Interference Alignment for the Network MIMO," Personal, Indoor and Mobile Radio Communications, 2009 IEEE 20th International Symposium, Sep. 13-16, 2009, pp. 2519-2523.

* cited by examiner

METHOD FOR DETERMINING PRECODING MATRIXES FOR COMMUNICATION AND A SYSTEM THEREFROM

RELATED APPLICATIONS

This application claims the benefit of Singapore Patent Application no. 201205782-4, filed on 3 Aug. 2012. The disclosure of the above priority application is hereby incorporated by reference in its entirety.

TECHNICAL FIELD

The present disclosure describes embodiments generally relating to a method for determining precoding matrixes for communication and a system therefrom.

BACKGROUND

With proliferation of communication devices and the ever increasing demand for higher data rates, interference issues are paramount in current and future generation communication systems. Base station (BS) cooperation is a communication paradigm promising significant system capacity targeting inter-cell interference elimination. It has been shown that an improvement performance of cellular systems can be achieved with the aid of BS cooperation and a subsequent increase in throughput can be as large as an order of magnitude. In view of such potential in the technology, BS cooperation is being adopted in various communication standards, such as 3GPP LTE-Advanced and IEEE 802.16m, as effective means to improve the coverage of high data rate services and increase the system throughput.

SUMMARY

According to various embodiments, there is provided a method for determining precoding matrixes for a communication of a first base station and a second base station with a first mobile station and a second mobile station, the communication including a first signal channel between the first base station and the first mobile station, a second signal channel between the first base station and the second mobile station, a third signal channel between the second base station and the first mobile station, and a fourth signal channel between the second base station and the second mobile station, the method including: determining a first sub-set of a set of precoding matrixes based on a predetermined consideration of SNR between the first base station and the second base station and the first mobile station and the second mobile station, the set of precoding matrixes comprising a first precoding matrix for the first signal channel, a second precoding matrix for the second signal channel, a third precoding matrix for the third signal channel and a fourth precoding matrix for the fourth signal channel; and generating a second sub-set of the set of precoding matrixes based on the first sub-set of the set of precoding matrixes.

According to various embodiments, there is provided a system including: a first base station and a second base station, for communication with a first mobile station and a second mobile station, the communication including a first signal channel between the first base station and the first mobile station, a second signal channel between the first base station and the second mobile station, a third signal channel between the second base station and the first mobile station, and a fourth signal channel between the second base station and the second mobile station; a first determination module configured to determine a first sub-set of a set of precoding matrixes based on a predetermined consideration of SNR between the first base station and the second base station and the first mobile station and the second mobile station, the set of precoding matrixes comprising a first precoding matrix for the first signal channel, a second precoding matrix for the second signal channel, a third precoding matrix for the third signal channel and a fourth precoding matrix for the fourth signal channel; and a first generation module configured to generate a second sub-set of the set of precoding matrixes based on the first sub-set of the set of precoding matrixes.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1:
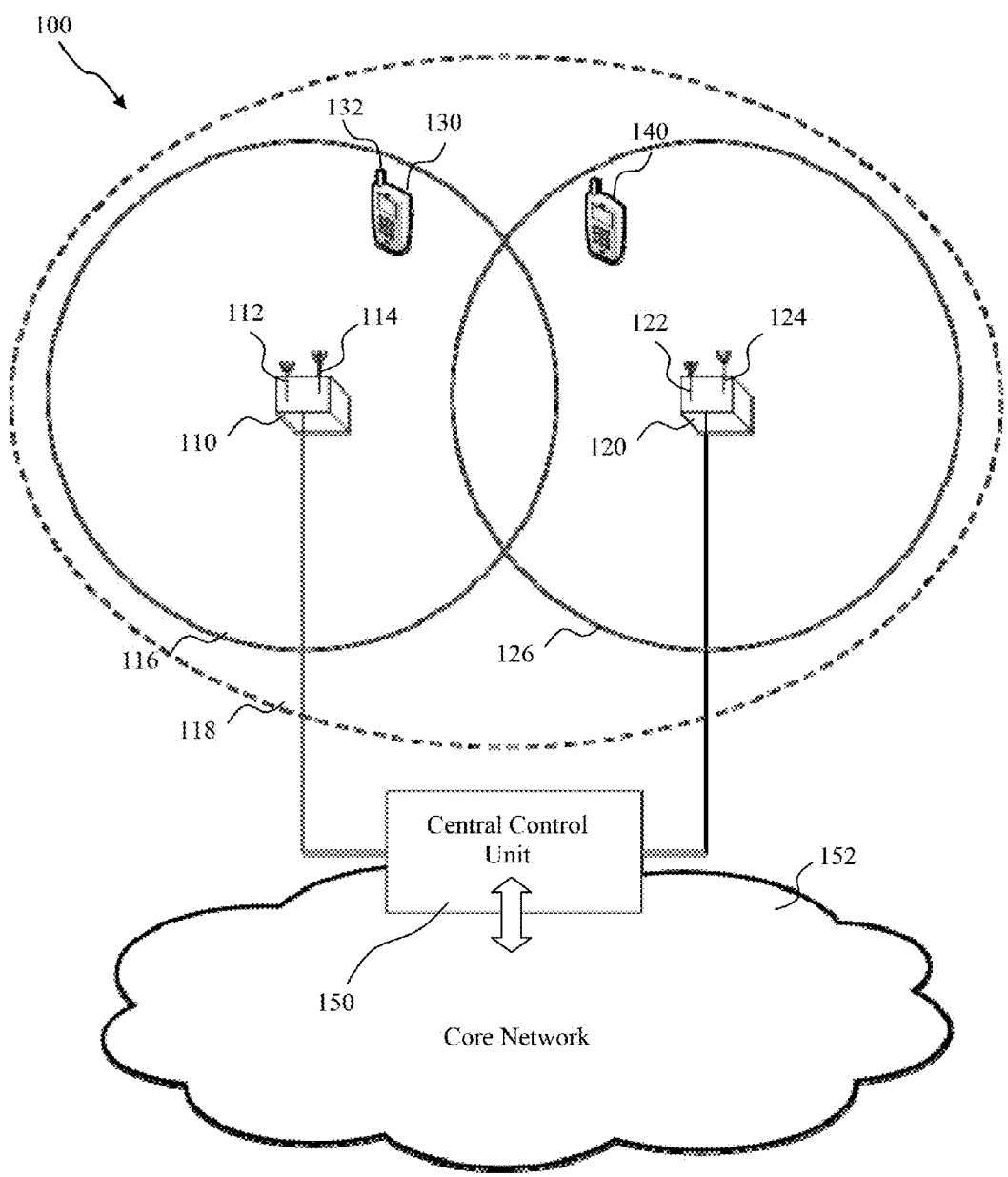
FIG. 1 illustrates a communications system arrangement according to an embodiment.

BS cooperation improves system performance through information exchange amongst multiple base stations. Generally, the performance improvement increases with the amount of information exchanged. In a full BS cooperation scheme, real-time data exchange is carried out and requires a high-capacity backbone between multiple base stations, so as to enable all necessary information exchanges, including user data, control signals, and channel state information (CSI).

Full cooperation with involvement of extensive cells is expected to substantiate the full potential of BS cooperation. However, in practice, it imposes a huge challenge as it requires the implementing of expensive super-high-speed and high-capacity backhauls in cellular networks.

In order to substantiate the full potential of BS cooperation, a full cooperation between base stations with involvement of extensive cells can be carried out. However, in practice, it imposes a huge challenge in implementing expensive super-high-speed and high-capacity backhauls in cellular networks. Recently, there have been growing interests to mitigate the backhaul problem.

On one hand, and from a BS perspective, instead of having full cooperation involving all BS's, it has been proposed to cluster a number of base stations for cooperation. On another hand, and from a mobile user's perspective, users within each cell or cluster may also be treated differently. Users are challenged for the necessity of corporation and only selective users are involved in BS cooperation. A scheme which addresses such a combination of these two kinds of requirements is expected to relax the backhaul requirement on capacity substantially. It is noted that real-time data exchange is still required, although the quantity should be cut down to a fraction of the original full cooperation. Due to the high volume nature of data, tensions on the backhaul are still imposed in terms of capacity and latency, especially for the applications where legacy non-fiber type backhaul is employed.

An alternative as to full cooperation can include a second type of coordination known as coordination without real-time data. It imposes a minimal to moderate requirement to the backhaul capacity. In the scheme, there can be an exchange of CSI or control information, although data exchange is excluded, which consumes the most of the backhaul capacity.

Embodiments of a method of base station cooperation and a system for base station cooperation are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. The system according to various embodiments can include a controller which may include a memory which is for example used in the processing carried out by the system for base station cooperation. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

FIG. 1 illustrates a communications system according to an embodiment. In an embodiment, system 100 or a communication network, is provided. The term "communication network" can be interchangably referred to as a "communication system". As used herein, the term "communication network" generally refers to a wireless communication network.

The term "communication network" can also include any method or medium for transmitting (or receiving) information from one communication entity to another. The communication network is formed via a communication connection among communication entities (or may be referred to as nodes). A "communication connection" may generally refer to a link to provide information transfer between one entity and another entity. For example, a communication network may include a plurality of communication devices.

In an embodiment, the system 100 is configured for operation as part of a radio operations standard, in this case a Long Term Evolution (LTE)-Advanced standard. In other embodiments, the system can be configured according to a radio communication standard, for example: GSM (Global System for Mobile Communications); UMTS (Universal Mobile Telecommunications System); WiMax (as part of any one of a revision for the IEEE 802.16m standard); LTE (Long Term Evolution); or any one of a communication standard for the wireless transmission of data.

The present disclosure discusses providing a system 100 with a view to provide a wireless data transmission service, or in an embodiment—mobile broadband service. Base station 110 is provided as part of the system 100. Base Station 110 includes an antenna 112 for communication with a mobile station 130.

In the context of various embodiments in the present disclosure, the term "base station" refers to a communication device that is capable of providing access to a communication network. The base station 110 can be used to communicate with subscriber stations, for example, for providing wireless connectivity including but not limited to access points and the like. The base station 110 can also serve a relay station or as one of a plurality of relay stations in a communication network. For example, the base station 110 may be configured to relay data between a core network of the communication network and another base station in the communication network. The base station 110 can be, but is not limited to, for example, a node, an access point, or a personal basic service set central point. In an embodiment, the base station can be a macro base station. In an embodiment, the base station can be a small cell, or a microcell, or a picocell, or a femtocell.

In an embodiment, the base station 110 includes a plurality of antennas. In an embodiment, the base station 110 includes antennas 112, 114. With growth and demand for high speed high data rate wireless communication, more antennas, and antennas covering a multitude of frequency bands are required. Further, base stations are geographically selected for a maximization of telecommunication coverage. As technology progresses, the siting of a base station does not change, and additional antennas are needed as a progression is made in the standardization of communication protocol. In an embodiment, antennas 112, 114 collaborate in communication with the mobile station 130. In other embodiments, the antennas may be configured for independent operation and do not collaborate in data communication.

In an embodiment, the antennas 112, 114 each include a transceiver. In the context of various embodiments, the term "transceiver" refers to a combination of a transmitter and a receiver. For example, a transceiver may be the transmitter and receiver combined into a single package. In general, a transceiver includes both transmitting and receiving capabilities and functions. In an embodiment, the antenna 112 is a transmitter and the antenna 114 is a receiver. According to an embodiment, the antennas 112, 114 can transmit and/or receive data services or data communication, including any one of an analog and a digital communication, and further including voice services.

In an embodiment, mobile station 130 is provided, including an antenna 132 for communication with the base station 110. In an embodiment, the antenna 132 of the mobile station 130 is in data communication with an antenna 112 of the base station. In an embodiment, the mobile station 130 is provided with a pair of antennas 132 and 134. In an embodiment, the antennas 132, 134 of the mobile station are in data communication with the antennas 112, 114 of the base station 110.

In an embodiment, the mobile station 130 is a mobile telephone. The mobile station 130 can also be known in standardized terms as a user equipment. As used herein, the reference "mobile station" can refer to a machine or an apparatus or a system that facilitates data communication, which includes sending and/or receiving data information. The mobile station can be, for example and not limited to, a mobile phone, a cellular phone, a mobile computer configured with a mobile broadband adapter, or any other kind of communication equipment. In other embodiments, the mobile station can be any of a Personal Digital Assistant (PDA), a Personal Communication Service (PCS) phone, a Global System for Mobile (GSM) phone, a Wideband Code Division Multiple Access (WCDMA) phone, a Mobile Broadband System (MBS) phone, etc. The term "mobile station" may interchangably be referred to as terms "User Equipment (UE)", "Subscriber Station (SS)", "Mobile Subscriber Station (MSS)", "mobile terminal", "Advanced Mobile Station (AMS)", etc. A mobile station can encompass all user equipment and software for communication with a mobile network or a communications network.

In various embodiments, the mobile station can be any one of a communication device, a communication terminal, a relay station, a communication port, a station, a subscriber station, and a substation. The mobile station can be understood to be an endpoint of a communication connection, for example an endpoint which can be used by a participant in a communication network.

In the present disclosure, the term "operate" may refer to "function", or "work", or "communicate". As used herein, the term "communicate" refers to send or transmit or receive. The term "receive" may interchangably be referred but not limited to as listen, or collect, or detect. For example, "receive" may further include to determine that the received request is correctly or incorrectly obtained. When correctly obtained, the received request is identical or at least substantially similar as the transmitted request. Such determining of a correct or incorrect request may be performed by error detections, for example, cyclic redundancy check (CRC).

In an embodiment, a base station 110 is in communication with a mobile station 130 utilizing radio resources. In the disclosure, mention is made of "radio resources" which can refer to any portion of a resource or resources that may be needed for acquisition of a service in a communication network. For example, the radio resources can be but are not limited to networks, frequency bands, carriers, time slots, logical channels.

The term "serve" refers to providing a service. In this context, a service may be, for example, a transmission or a reception of control messages or data. The term "allocate" generally refers to being determined or pre-determined, being assigned, being arranged. Allocation may be performed dynamically. The term "radio cell" refers to a geographical coverage area that is served by a base station or relay station. Within such a geographical coverage area, mobile stations can access the communication network through a serving base station.

In an embodiment, the base station 110 is configured to send a data signal to a mobile station 130. As used herein, the term "signal" refers to a communication signal. The signal may be a message, which may be a short information sent from one entity to at least another entity. A signal may be a packet or a cluster. For example, a signal may include precisely formatted data that is sent and received by nodes and can represent a request, report, or an event. The signal can be included in or encoded in or indicated in another signal.

According to an embodiment, a second base station 120 is provided with an antenna, or a set of antennas 122, 124, for communication with a mobile station 140.

In an embodiment, a central unit 150 is provided, the base station 110 in communication with the central unit 150. The central unit 150 can be a base station controller and is further in communication with a core network 152. The central unit 150 can include a processor, a memory or a data storage medium, and multiple inputs and outputs for receiving and transmitting statistical information and control instructions to on or a plurality of base stations. The term "core network" refers to a switching network used to carry signaling traffic to and from radio access networks or access subsystems. The core network can include switching centers and gateways that interconnect radio access networks and the network backbone, and, or the Internet. Further, according to an embodiment, the central unit 150 is in communication with a first base station 110 and a second base station 120.

In an embodiment, the central unit 150 is provided to facilitate a cooperation between a first base station 110 and a second base station 120. In another embodiment, cooperation between a first base station and a second base station is supported by individual controllers operating within the first base station and the second base station, the first base station and the second base station provided with a permanent data connection between each other.

In an embodiment, the first base station 110 and the second base station 120 are coupled to each other with a high-speed dedicated link. The coupling can be a direct coupling or can be through a central control unit 150. The high-speed dedicated link can be provided by optical fiber, a wired backbone connection or a highly directional wireless microwave link. The high-speed dedicated link facilitates data transfer between the first base station 110 and the second base station 120. However, such high-speed dedicated links can be very expensive to implement and may not be feasible for multiple site propagation. In an embodiment, the first base station 110 and the second base station 120 are coupled to each other with a standardized data coupling. Such a data coupling would be most cost efficient, and is satisfactory for information transfer between the first base station 110 and the second base station 120 according to an embodiment of the present disclosure. In an embodiment, the data coupling is a dedicated wireless transmission path between the base stations, or between the base stations and the central unit.

According to an embodiment, a cell 116 is provided by a base station 110, or by signal coverage of the antennas 112, 114 in a base station 110. Designated radio resources, for example radio or signal frequencies, are provided for the base station 110 for operation in and of the cell 116. Further, according to an embodiment, a cell 126 is provided by a second base station 120, or by signal coverage of the antennas 122, 124 in the second base station 120. Radio resource is similarly allocated to the second base station 120 for operation in and of a cell 126. As might be understood, radio resource, especially frequency spectrum, is a limited resource which is divided into non-overlapping spectrum bands which are assigned to different cells. However, there can be a re-use in the frequency bands, i.e. the same spectrum bands are re-assigned to other cells. Co-channel interference arises in the communication networks due to such a phenomenon of frequency reuse. In such a case, besides the intended signal from the base station within the cell, signals with the same frequencies arrive at the receiver from the undesired transmitters distantly located in some other cells, which lead to deterioration in receiver performance. Due to such interference limitation of communication networks, a task of high data delivery cannot be accomplished by simply increasing the signal power of a transmission.

Further, a coordination net 118 is provided, encompassing both the first mobile station 110 and the second mobile station 120. In an embodiment, the coordination net 118 encompasses both the cells 116, 126 generated and operated by the first base station 110 and the second base station 120 respectively. The coordination net 118 represents the area in which first base station 110 and second base station 120 can carry out a base station cooperation.

A strategy of reducing the performance-limiting interference is to reduce the inter-cell interference through cooperative transmission. Cooperative Multipoint (CoMP) transmission and reception is a framework that refers to a system where several geographically distributed nodes cooperate with the aim of improving the performance of the devices or mobile stations served in a common cooperation area.

In base station cooperation, inter-cell interference is reduced in the system in both the downlink or transmission and the uplink or reception. As mentioned above, base station cooperation may include a full cooperation with real-time data exchange or a coordination without real-time data exchange.

In an embodiment, a base station cooperation is carried out between the first base station 110 and the second base station 120. In an embodiment, without real-time data exchange is carried out between the first base station 110 and the second base station 120.

In an embodiment, a coordination, where there is no real-time data exchange, is carried out. In the scheme, an exchange of CSI or control information is required, but is usually minor or modest compared to that of real time data. In order to achieve a cooperation gain comparable to that of the full base station cooperation, multiple-input multiple-output (MIMO) X channel communication is considered, where multiplexing gains can be maximal for scenarios without data exchange in base station cooperation.

In an embodiment, CSI can refer to known channel properties of a communication link. CSI describes how a signal propagates from the transmitter to the receiver and represents the combined effect of, for example, scattering, fading, and power decay with distance. The CSI makes it possible to adapt transmissions to current channel conditions, which is important for achieving reliable communication with high data rates in multiantenna systems.

In an embodiment, CSI can be estimated at the receiver and is usually quantized and fed back to the transmitter. According to various embodiments, statistical CSI (or long-term CSI) is obtained, including a statistical characterization of the channel. Such CSI can include, for example, the type of fading distribution, the average channel gain, the line-of-sight component, and the spatial correlation.

In an embodiment, instantaneous CSI (or short-term CSI), which includes current channel conditions, is obtained and exchanged between the base stations. Such instantaneous CSI is also used in the optimization of a base station cooperation according to various embodiments. However, although instantaneous CSI may be continually updated to reflect changing channel conditions, according to various embodiments, precoding matrixes are determined and chosen for data transmission in base station cooperation only upon initiation of the base station cooperation, and are not continually updated to reflect changing instantaneous CSI.

According to an embodiment, precoding matrixes are obtained and continually updated based on instantaneous CSI updates. A predetermined refresh rate can be included to provide a frequency of updating precoding matrixes for data transmission in base station cooperation.

In an embodiment, where a first base station 110 and a second base station 130 cooperatively serve two mobile stations, a maximum achievable multiplexing gain per user or user equipment or station is 4/3M which is 67% of the maximum achievable gain, 2M, as in full cooperation schemes, where M is the number of antennas each base station or mobile station has. In various embodiments, all base stations and mobile stations are provided with the same number of antennas. In various embodiments, multiple base stations are provided and the multiple base stations cooperatively serve multiple mobile stations. In various embodiments, the number of base stations and the number of mobile stations provided are unequal.

In an embodiment, Interference Alignment is carried out in the establishing of MIMO X channel communication. Degrees of freedom (DoF) characterization can be considered in a capacity characterization for a network. The degrees of freedom represent the rate of growth of the network capacity with the log of the signal to noise ratio (SNR). In most cases, the spatial degrees of freedom turn out to be the number of non-interfering paths that can be created in a wireless network through signal processing at the transmitters and receivers. While time, frequency and space all offer degrees of freedom in the form of orthogonal dimensions over which communication can take place, spatial degrees of freedom are especially interesting in a distributed network.

Interference alignment allows many interfering users to communicate simultaneously over a limited number of signaling dimensions by confining the interference at each receiver into a space spanned by a small number of dimensions, while keeping the desired signals separable from interference. In an embodiment, interference alignment is carried out to project interference subspace from multiple dimensions to a single dimension or reduced dimensions such that an optimization of capacity can be carried out.

Figure 2:
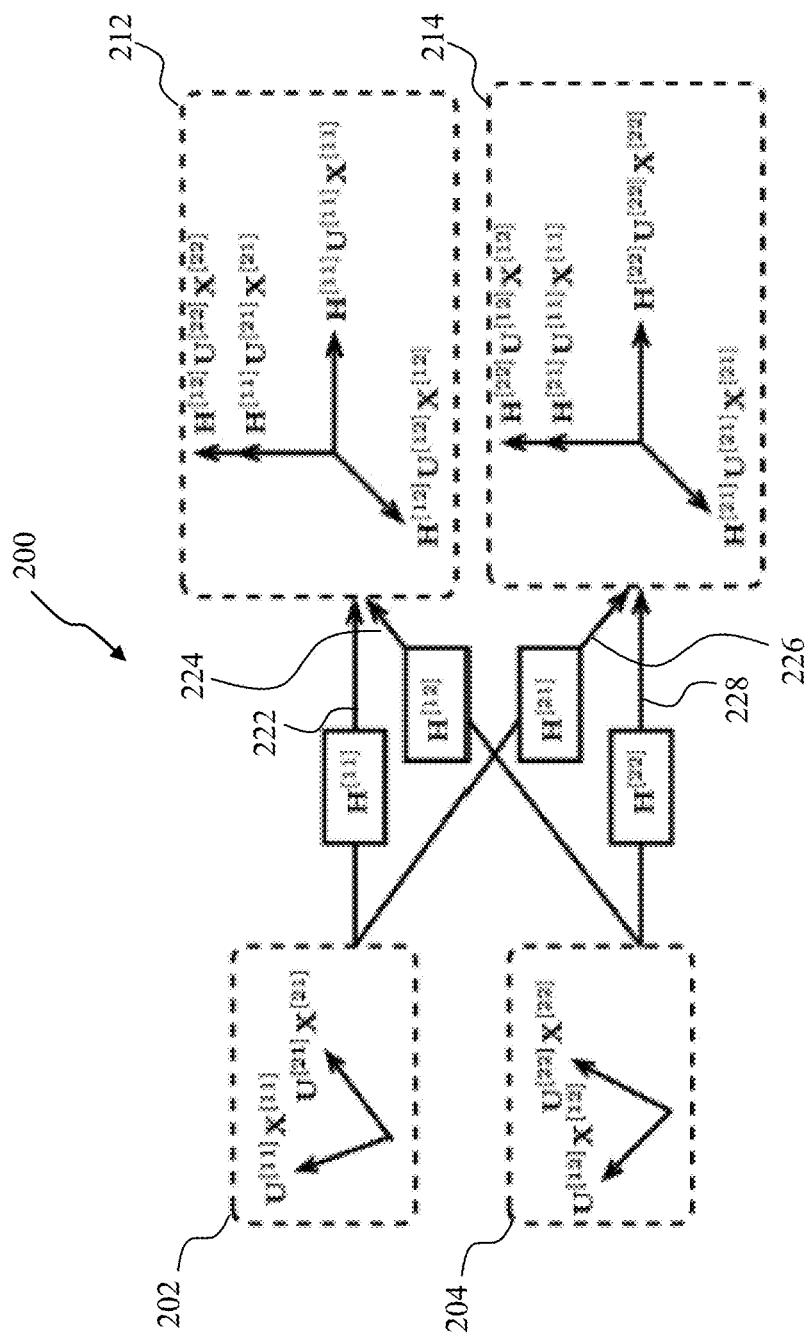
FIG. 2 illustrates a model for a X channel network.

FIG. 2 illustrates a model for a X channel network. In FIG. 2, a user X network 200 is shown where 4/3 times M degrees of freedom are shown to be achievable using interference alignment over 3 signaling dimensions, i.e., 3 symbols per user and where M is the number antennas of each user. In an embodiment, a first transmitter 202 and a second transmitter 204 are provided, which transmit in accordance to a MIMO configuration to a first receiver 212 and a second receiver 214.

In an embodiment, both users 212, 214 each receive two transmitted streams of data where $x^{ij}$ represents the transmitted data streams from transmitter j intended to receiver i. For example, first receiver 212 receives a data stream $x^{11}$ 222, and a data stream $x^{12}$ 224, while second receiver receives a data stream $x^{21}$ 226, and a data stream $x^{22}$ 228. $G^{ij}$ represent the precoding vectors provided at the first transmitter 202 and the second transmitter 204, and $H^{ij}$ represents the channel coefficients between the first transmitter 202 and the second transmitter 204, and the first receiver 212 and the second receiver 214.

In the embodiment, it is noted that no data exchange is carried out between the first transmitter 202 and the second transmitter 204. Further, there is no cooperation between the first receiver 212 and the second receiver 214. It can also be observed that the interference is aligned at the first receiver 212 and the second receiver 214 in order to maximize multiplexing gain. Further, it may be noted that multiple data streams 222, 224, 226, 228 are transmitted from the first transmitter 202 and the second transmitter 204; multiple data streams are transmitted at each transmitter.

Figure 3:
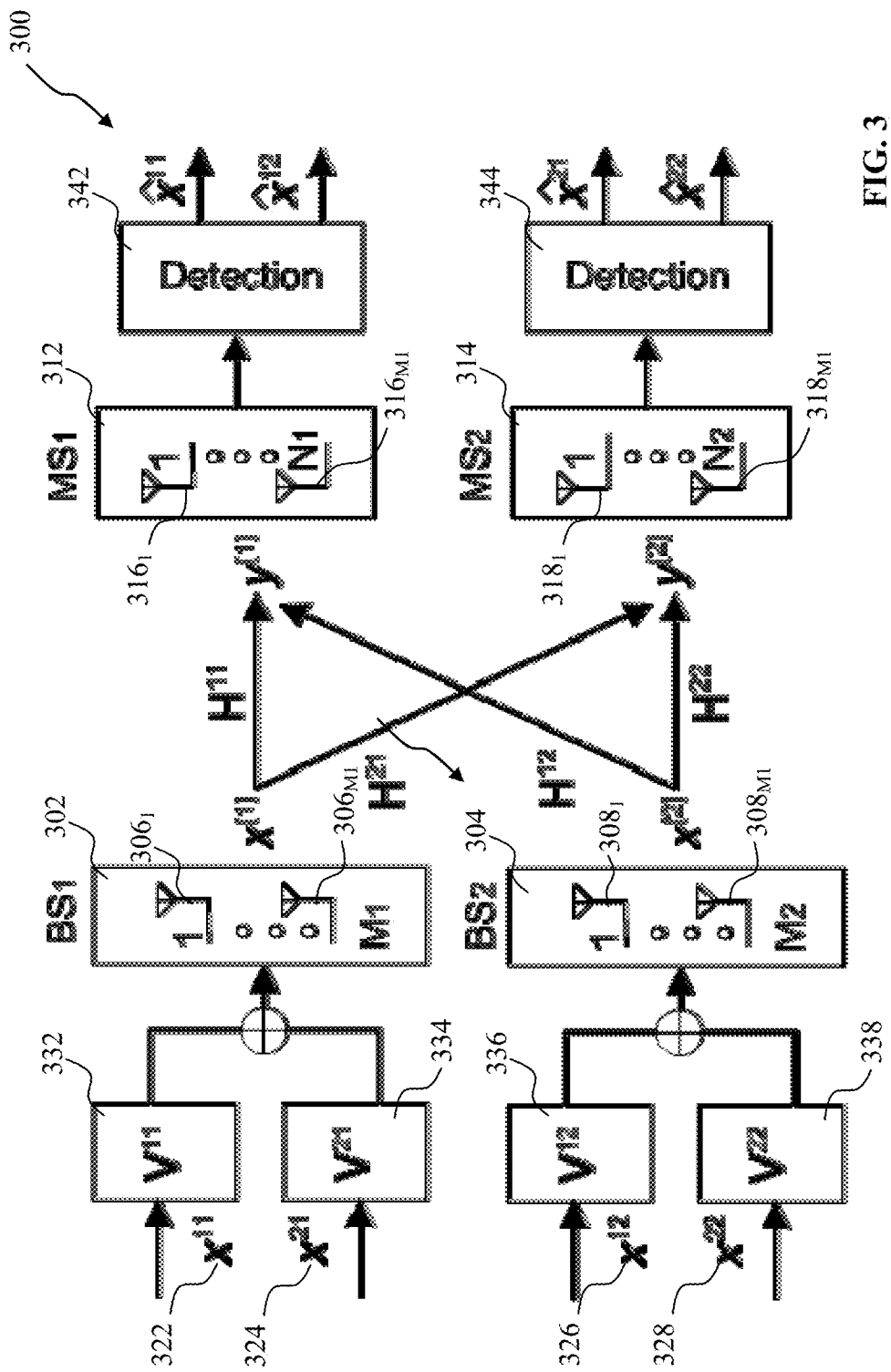
FIG. 3 illustrates a system model according to an embodiment.

FIG. 3 illustrates a system model according to an embodiment. System model 300 illustrates a base station cooperation in MIMO X channel according to an embodiment. In an embodiment, Interference Alignment is carried out, in seeking to achieve maximum multiplexing gain in X channels, which is theoretically achievable by Interference Alignment. In an embodiment, a beamforming procedure is carried out during the Interference Alignment, which seeks to align all interference subspace in order to stretch the signal subspace. In beamforming, elements are combined in a phased array in such a way that signals at particular angles experience constructive interference while others experience destructive interference.

In a beamforming procedure, there are typically two sets of beamforming weights to be determined. According to a method in the art of carrying out Interference Alignment, as long as the second set of beamforming weights fulfill certain conditions with respect to the first set of beamforming weights, the maximum multiplexing gain can be equally achieved, regardless of what the first set of beamforming weights are. In other words, the first set of beamforming weights does not affect the multiplexing gain and is usually set randomly.

However, it has been determined by the inventors of the present application that the choice and determination of the first set of beamforming weights, together with the second set which is automatically generated according to Interference Alignment conditions, affects the overall performance of the communication system. In fact, a calculated determination of the first set of beamforming weights can subsequently lead to an improved overall post-processing signal-to-noise ratio (SNR).

In an embodiment according to the present disclosure, a method of base station cooperation includes determining a first set of beamforming weights, subsequently generating a second set of beamforming weights according to the first set, under Interference Alignment conditions so as to achieve the optimized overall post-processing SNR, in addition to achieving the maximum multiplexing gain. Correspondingly, a system design according to a method of base station cooperation is provided.

According to various embodiments, a beamforming weight can also be understood to be correlated to a precoding matrix. Precoding is a generalization of beamforming to support multi-stream (or multi-layer) transmission in multi-antenna wireless communications. Precoding in the downlink of cellular networks, known as network MIMO or coordinated multipoint (CoMP), is a generalized form of multi-user MIMO that can be analyzed by the same mathematical techniques. Utilizing precoding matrixes in a MIMO communication arrangement allows for the achievement of achieve superior performance compared to other interference alignment schemes, in allowing a consideration of transmission SNR.

According to various embodiments, a set of beamforming weights can correlate to a set or collection of precoding matrixes corresponding to signal or transmission channels originating from a base station in signal or transmission communication, either in an intended data signal or in an interference signal, with a plurality of mobile stations.

FIG. 3 illustrates a X channel model 300, including a first base station $BS_1$ 302 and a second base station $BS_2$ 304, transmitting to a first mobile station $MS_1$ 312 and a second mobile station $MS_2$ 314 cooperatively with the same time and frequency resources in the downlink.

According to an embodiment, the first base station $BS_1$ 302 is equipped with $M_1$ transmitting antennas $306_1 \ldots 306_M$, and the second base station $BS_2$ 204 is equipped with $M_2$ transmitting antennas $308_1 \ldots 308_M$. In an embodiment, the first mobile station $MS_1$ 312 is equipped with $N_1$ receiving antennas $316_1 \ldots 316_M$ and the second mobile station $MS_2$ 314 is equipped with $N_2$ receiving antennas $318_1 \ldots 318_M$. Received signals at the first mobile station $MS_1$ 312 and the second mobile station $MS_2$ 314 can thus be represented as:

$$y^{[1]} = H^{11}x^{[1]} + H^{12}x^{[2]} + n^{[1]}$$

$$y^{[2]} = H^{21}x^{[1]} + H^{22}x^{[2]} + n^{[2]} \quad (1)$$

where $y^{[1]}$ is a $N_1 \times 1$ received signal vector at $MS_1$, $y^{[2]}$ is a $N_2 \times 1$ received signal vector at $MS_2$, $n^{[1]}$ is a $N_1 \times 1$ additive white Gaussian noise (AWGN) vector at $MS_1$, $n^{[2]}$ is a $N_2 \times 1$ AWGN vector at $MS_2$, $x^{[1]}$ is a $M_1 \times 1$ transmitted signal vector at $BS_1$, $x^{[2]}$ is a $M_2 \times 1$ transmitted signal vector at $BS_2$, $H^{11}$ is a $N_1 \times M_1$ channel matrix between $MS_1$ and $BS_1$, $H^{12}$ is a $N_1 \times M_2$ channel matrix between $MS_1$ and $BS_2$, $H^{21}$ is a $N_2 \times M_1$ channel matrix between $MS_2$ and $BS_1$, $H^{22}$ is a $N_2 \times M_2$ channel matrix between $MS_2$ and $BS_2$.

According to an embodiment, the fading channel matrixes are assumed static throughout the concerned transmission duration and perfect channel knowledge is available at both the first base station 302 and the second base station 304. It has been described that the multiplexing gain of the MIMO X channel is bounded by:

$$\eta \leq \frac{4}{3} \min(M_1 + M_2, N_1 + N_2, \max(M_1, N_1, M_2, N_2)) \quad (2)$$

In an embodiment of the present disclosure, the number of transmitting antennas $M_1$ and $M_2$ of the first base station 302 and the second base station 304 and the number of receiving antennas $N_1$ and $N_2$ of the first mobile station 312 and the second mobile station 314 are set to M, i.e. $M_1=M_2=N_1=N_2=M$. This facilitates subsequent discussion of the precoding design according to various embodiments. In other embodiments, M and N can be any number of transmitting antennas and receiving antennas in accordance to a communications system design.

According to an embodiment, there is provided a method of base station cooperation between the first base station 302 and the second base station 304, the first base station 302 and the second base station 304 in a MIMO communication arrangement with a first mobile station 312 and a second mobile station 314. The present disclosure describes the working of such a method and a corresponding system.

In an embodiment, the communication arrangement includes a first signal channel between the first base station and the first mobile station, a second signal channel between the first base station and the second mobile station, a third signal channel between the second base station and the first mobile station, and a fourth signal channel between the second base station and the second mobile station.

In an embodiment where the antennas are set to M, it is easily observed from equation (2) that the maximum multiplexing gain η of the MIMO X channel is $$\frac{4}{3}M$$

Such a maximum multiplexing gain can be achieved by transmission of four independent codewords as illustrated in FIG. 3: $x^{11}$ 322, $x^{21}$ 324, $x^{12}$ 326, and $x^{22}$ 328 respectively; where $x^{ij}$ is a M×1 vector representing a codeword to be transmitted from $BS_j$ to $MS_i$ (i, j=1, 2). The corresponding M×M precoding matrixes for the four codewords are $V^{11}$ 332, $V^{21}$ 334, $V^{12}$ 336, and $V^{22}$ 338 respectively. In an embodiment, the transmitted signal vectors can be represented as:

$$x^{[1]} = V^{11}x^{11} + V^{21}x^{21}$$

$$x^{[2]} = V^{12}x^{12} + V^{22}x^{22} \quad (3)$$

According to an embodiment, it is noted that 4M data streams are transmitted, i.e. $x^{11}$ 322, $x^{21}$ 324, $x^{12}$ 326, and $x^{22}$ 328, each having M data streams. In an embodiment, the data streams 322, 324, 326 and 328 are to be decodable at the receivers 312 and 314, without any cooperation between the first mobile station 312 and the second mobile station 322. Further, the maximum multiplexing gain η of 4/3M in the MIMO X channel is also desired, even for cases when the number of antennas M is not a multiple of 3, where a concept of 3-symbol extension (either in time or frequency domain) is introduced. In an embodiment, a method of base station cooperation including obtaining a plurality of optimized precoding matrixes can be carried out in a frequency domain on a sub-carrier level.

According to an embodiment, a 3-symbol extension is carried out, i.e. where the channel is extended such that there is effectively a 3M×3M channel, over which is to be achieved 4M degrees of freedom. In the 3-symbol extension, it is assumed that the channel matrixes are fixed, so that the 3-symbol extension does not elicit a new channel matrix over each slot. Instead, each M×M channel matrix is repeated three times to produce a 3M×3M block diagonal matrix.

In an embodiment, the transmitted data $x^{ij}$ does not change over the 3-symbol periods, i.e. $x^{ij}(n) = x^{ij}(n+1) = x^{ij}(n+2)$, where (i, j=1, 2) and n is the symbol index. In the subsequent description, the 3-symbol extension is described in the time domain. It is noted that it is equally applicable to the frequency domain extension as well.

In an embodiment, instead of processing one data symbol at a time, three symbols are considered together. Stacking 3 symbols $y^{[i]}(3n)$, $y^{[i]}(3n+1)$, and $y^{[i]}(3n+2)$ at the same receiver, where i=1 or 2, forms a taller symbol $\bar{y}^{[i]}(n) = [(y^{[i]}(3n))^T (y^{[i]}(3n+1))^T (y^{[i]}(3n+2))^T]^T$. The resulting received 3-symboll tall 3M×1 signals at the two receivers 312 and 314 are:

$$\bar{y}^{[1]}(n) = \bar{H}^{11}(n)\bar{x}^{[1]}(n) + \bar{H}^{12}(n)\bar{x}^{[2]}(n) + \bar{n}^{[1]}(n)$$

$$\bar{y}^{[2]}(n) = \bar{H}^{21}(n)\bar{x}^{[1]}(n) + \bar{H}^{22}(n)\bar{x}^{[2]}(n) + \bar{n}^{[2]}(n) \quad (4)$$

where 3M×1 vectors $\bar{x}^{[i]}(n)$ and $\bar{n}^{[i]}(n)$ are stacked similar to $\bar{y}^{[i]}(n)$ from transmitted signal at transmitter i (first base station 302 and second base station 304) and noise at the receiver j (first mobile station 312 and second mobile station 314) respectively (i, j=1, 2), and:

$$\bar{H}^{ij}(n) = \begin{bmatrix} H^{ij}(3n) & 0 & 0 \\ 0 & H^{ij}(3n+1) & 0 \\ 0 & 0 & H^{ij}(3n+2) \end{bmatrix} \quad (5)$$

(i, j=1, 2) is the extended block diagonal channel. In various embodiments, index n is dropped in order to facilitate solving of the system model.

Interference alignment can refer to a careful choice of precoding design in order to align all the interference vectors which cast overlapping shadows. In X channel, the received 3-symbol extension signal can be represented as follows, after expanding equations (4) with equations (3):

$$\bar{y}^{[1]} = (\bar{H}^{11}\bar{V}^{11}x^{11} + \bar{H}^{12}\bar{V}^{12}x^{12}) + (\bar{H}^{11}\bar{V}^{21}x^{21} + \bar{H}^{12}\bar{V}^{22}x^{22}) + \bar{n}^{[1]}$$

$$\bar{y}^{[2]} = (\bar{H}^{22}\bar{V}^{22}x^{22} + \bar{H}^{21}\bar{V}^{21}x^{21}) + (\bar{H}^{22}\bar{V}^{12}x^{12} + \bar{H}^{21}\bar{V}^{11}x^{11}) + \bar{n}^{[2]} \quad (6)$$

where $\bar{V}^{ij} = [(V^{ij}(3n))^T (V^{ij}(3n+1))^T (V^{ij}(3n+2))^T]^T$, (i, j∈{1,2}) is a 3M×M extended precoding matrix for transmission from $BS_j$ (first base station 302 and second base station 304) to $MS_i$ (first mobile station 312 and second mobile station 314). In an embodiment, there is provided a set of precoding matrixes including a first precoding matrix for a first signal channel, a second precoding matrix for a second signal channel, a third precoding matrix for a third signal channel and a fourth precoding matrix for a fourth signal channel in a 2×2 MIMO arrangement between the first base station and the second base station and the first mobile station and the second mobile station. According to an embodiment, the items within the first bracket of each equation in (6) can be desired signals while those within the second can be considered interference. The objective of interference alignment is to align the interference which is achieved by:

$$\overline{V}^{12} = (\overline{H}^{22})^{-1}\overline{H}^{21}\overline{V}^{11}$$

$$\overline{V}^{22} = (\overline{H}^{12})^{-1}\overline{H}^{11}\overline{V}^{21} \qquad (7)$$

According to an embodiment, the system provides for two degrees of freedom. As such, a determination can be made for any two precoding matrixes, and then derive the remaining two precoding matrixes based on interference constraints for a 2×2 system.

In an embodiment, precoding matrix $V^{11}$ is determined for a first signal channel formed between the first base station and the first mobile station, and precoding matrix $V^{12}$ is determined for a second signal channel formed between the second base station and the first mobile station. Subsequently, precoding matrixes $V^{21}$ and $V^{22}$ are generated based on $V^{11}$ and $V^{12}$ and on the interference alignment conditions in equations (7).

In an embodiment, precoding matrix $V^{11}$ is determined for a first signal channel formed between the first base station and the first mobile station, and precoding matrix $V^{22}$ is determined for a second signal channel formed between the second base station and the second mobile station. Subsequently, precoding matrixes $V^{12}$ and $V^{21}$ are generated based on $V^{11}$ and $V^{22}$ and on the interference alignment conditions in equations (7).

According to an embodiment, once the precoding matrixes $\overline{V}^{11}$ and $\overline{V}^{21}$ for the first base station 302 are determined, the vectors $\overline{V}^{12}$ and $\overline{V}^{22}$ for the second base station 304 are automatically determined according to the equations in (7). In an embodiment, with these determined precoding matrixes, the output signals (6) at the first mobile station 312 and the second mobile station 314 become:

$$\overline{y}^{[1]} = \overline{W}^{[1]} \begin{bmatrix} x^{11} \\ x^{12} \\ x^{21} + x^{12} \end{bmatrix} + \overline{n}^{[1]} \qquad (8)$$

$$\overline{y}^{[2]} = \overline{W}^{[2]} \begin{bmatrix} x^{21} \\ x^{22} \\ x^{11} + x^{12} \end{bmatrix} + \overline{n}^{[2]}$$

where $\overline{W}^{[1]}$ and $\overline{W}^{[2]}$ are 3M×3M matrixes defined as:

$$\overline{W}^{[1]} = [\overline{H}^{11}\overline{V}^{11}\overline{H}^{12}(\overline{H}^{22})^{-1}\overline{H}^{21}\overline{V}^{11}\overline{H}^{11}\overline{V}^{21}]$$

$$\overline{W}^{[2]} = [\overline{H}^{21}\overline{V}^{21}\overline{H}^{22}(\overline{H}^{12})^{-1}\overline{H}^{11}\overline{V}^{21}\overline{H}^{21}\overline{V}^{11}] \qquad (9)$$

It can be observed from (8) that the interference term $x^{21}$ and $x^{22}$ in $\overline{y}^{[1]}$ for $MS_1$ 312 or $x^{11}$ and $x^{12}$ in $\overline{y}^{[2]}$ for $MS_2$ 314 are aligned in occupying the same signal subspace. A simple linear equalization at each mobile station will be able to decode the desired signal pairs with full rank $\overline{W}^{[1]}$ and $\overline{W}^{[2]}$ and sufficiently high SNR According to an embodiment, the maximum multiplexing gain of $$\frac{4}{3}M$$

is achievable as long as the precoding matrixes $\overline{V}^{11}$, $\overline{V}^{21}$, $\overline{V}^{12}$, and $\overline{V}^{22}$ satisfy the interference alignment conditions in equations (7). Further, in an embodiment, the full rank requirement for $\overline{W}^{[1]}$ and $\overline{W}^{[2]}$ should also be considered.

In an embodiment, for equations (7), $\overline{V}^{12}$ and $\overline{V}^{22}$ are uniquely determined by $\overline{V}^{11}$ and $\overline{V}^{21}$ whereas there are two degrees of freedom in determining the precoding matrixes $\overline{V}^{11}$ and $\overline{V}^{21}$. In Interference Alignment, Maximizing multiplexing gain is the primary objective. Since the choices of the two precoding matrixes $\overline{V}^{11}$ and $\overline{V}^{21}$ do not affect the multiplexing gain (as long as resulting $\overline{W}^{[1]}$ and $\overline{W}^{[2]}$ are full rank, which should be easy to fulfill due to randomness of channels), very often, $\overline{V}^{11}$ and $\overline{V}^{21}$ are generated randomly. In fact, the choices of $\overline{V}^{11}$ and $\overline{V}^{21}$ will have impact to the overall system performance, such as system SNR. The design issue of $\overline{V}^{11}$ and $\overline{V}^{21}$ is addressed next. In an embodiment, overall system SNR is maximized, at the same time achieving the maximum multiplexing gain.

In an embodiment, in order to achieve interference alignment, two precoding matrixes are solved to fulfill the conditions in equations (7). Substituting (7) into (6):

$$\overline{y}^{[1]} = (\overline{H}^{11}\overline{V}^{11}x^{11} + \overline{G}^{11}\overline{V}^{11}x^{12}) + \overline{H}^{11}\overline{V}^{21}(x^{21} + x^{22}) + \overline{n}^{[1]}$$

$$\overline{y}^{[2]} = (\overline{H}^{21}\overline{V}^{21}x^{21} + \overline{G}^{21}\overline{V}^{21}x^{22}) + \overline{H}^{21}\overline{V}^{11}(x^{11} + x^{12}) + \overline{n}^{[2]} \qquad (10)$$

where $\overline{G}^{11}$ and $\overline{G}^{21}$ are defined as follows:

$$\overline{G}^{11} = \overline{H}^{12}(\overline{H}^{22})^{-1}\overline{H}^{21}$$

$$\overline{G}^{21} = \overline{H}^{22}(\overline{H}^{12})^{-1}\overline{H}^{11} \qquad (11)$$

In an embodiment, $\overline{G}^{11}$ and $\overline{G}^{21}$ can be considered as effective extended channels for data streams $x^{12}$ 326 and $x^{22}$ 328 respectively.

According to an embodiment, in equations (10), parameters other than the two matrixes $\overline{V}^{11}$ and $\overline{V}^{21}$ to be optimized are either channels assumed known at the base stations or data and noise. In a closer examination of equations (10), all the channel relevant matrixes $\overline{H}^{11}$, $\overline{H}^{21}$, $\overline{G}^{11}$, and $\overline{G}^{21}$ are diagonal each composed of three M×M block matrixes. This can lead to possible simplification when designing the precoding matrixes $\overline{V}^{11}$ and $\overline{V}^{21}$. In fact, M×M sub-block matrixes of $\overline{V}^{11}$ and $\overline{V}^{21}$ can be optimized three times, instead of considering the 3M×3M whole matrixes. In effect, the optimization has been brought back to the symbol level from that in a 3-symbol extension level. The above process cuts down the optimization complexity significantly. In an embodiment, as the related channel matrixes are diagonal, the sub-block matrixes of $\overline{V}^{11}$ (or $\overline{V}^{21}$) are independent and the simplified optimization will not compromise the optimality. Therefore the received signals can be written back to symbol level to carry out an optimization for $V^{11}$ and $V^{21}$, i.e.

$$y^{[1]} = (H^{11}V^{11}x^{11} + G^{11}V^{11}x^{12}) + H^{11}V^{21}(x^{21} + x^{22}) + n^{[1]}$$

$$y^{[2]} = (H^{21}V^{21}x^{21} + G^{21}V^{21}x^{22}) + H^{21}V^{11}(x^{21} + x^{22}) + n^{[1]} \qquad (12)$$

where $G^{11}$ and $G^{21}$ are corresponding M×M sub-block matrixes $\overline{G}^{11}$ and $\overline{G}^{21}$ respectively. Comparing (10) and (12), it is clear that the signal dimensions to be considered have been reduced from 3M to M.

In an embodiment, the precoding matrixes are optimized based on SNR which eventually determines the end user throughput and performance. According to an embodiment, the received total power at $MS_1$ and $MS_2$ can be written respectively as follows, after some manipulations from equations (12):

$$P^{[1]} \triangleq E[(y^{[1]})^H(y^{[1]})] = P_S^{[1]} + P_I^{[1]} + \sigma_1^2$$

$$P^{[2]} \triangleq E[(y^{[2]})^H(y^{[2]})] = P_S^{[2]} + P_I^{[2]} + \sigma_2^2 \quad (13)$$

where $P_S^{[i]}$, $P_I^{[i]}$, $\sigma_i^2$ are desired signal power, interference power, and noise variance at $MS_i$ (i=1 or 2) respectively, and $$P_S^{[i]} = \|H^{i1}V^{i1}\|_F^2 + \|G_{i1}V^{i1}\|_F^2$$

$$P_I^{[i]} = 2\|H^{i1}V^{j1}\|_F^2 (j=1 \text{ or } 2, j \neq i) \quad (14)$$

where $\|\cdot\|_F$ is a Matrix Frobenius norm. According to an embodiment, the SNR of the two users, the first mobile station 312 and the second mobile station 314, can be represented as:

$$snr^{[1]} \triangleq \frac{P_S^{[1]}}{P_I^{[1]} + \sigma_1^2} = \frac{\|H^{11}V^{11}\|_F^2 + \|G^{11}V^{11}\|_F^2}{2\|H^{11}V^{21}\|_F^2 + \sigma_1^2} \quad (15)$$

$$snr^{[2]} \triangleq \frac{P_S^{[2]}}{P_I^{[2]} + \sigma_2^2} = \frac{\|H^{21}V^{21}\|_F^2 + \|G^{21}V^{21}\|_F^2}{2\|H^{21}V^{11}\|_F^2 + \sigma_2^2}$$

According to an embodiment, from equations (15), both SNRs are functions of $V^{11}$ and $V^{21}$ and as such, the functions cannot be maximized at the same time due to a conflict in objectives. In an embodiment, $snr^{[1]}$ increases with the norm of $V^{11}$ whereas $snr^{[2]}$ will decrease as the norm of $V^{11}$ increases. The values of $snr^{[1]}$ and $snr^{[2]}$ correspondingly increase and decrease with respect to $V^{21}$. According to an embodiment, $snr^{[1]}$ and $snr^{[2]}$ are considered jointly in order to optimize $V^{11}$ and $V^{21}$.

In an embodiment, an objective function of the geometric mean of $snr^{[1]}$ and $snr^{[2]}$ is considered, i.e., by maximizing the geometric mean of $snr^{[1]}$ and $snr^{[2]}$. Obtaining a geometric mean allows a balance between individual SNR and a fair distribution between the SNRs. In various embodiments, other criteria can also be used in joint consideration of SNR, for example, and not limited to, sum rate (best efforts), equal rate (fairness), minimum mean square errors, etc. Further, in an embodiment, a first SNR at a first mobile station is independently determined, and a second SNR at a second mobile station is subsequently determined based on the transmission capacity as well as the determined first SNR. In an embodiment, the geometric mean of $snr^{[1]}$ and $snr^{[2]}$ can be represented as:

$$snr^{[1]} \cdot snr^{[2]} = \frac{\|H^{11}V^{11}\|_F + \|G^{11}V^{11}\|_F}{2\|H^{11}V^{21}\|_F + \sigma_1^2} \cdot \frac{\|H^{21}V^{21}\|_F + \|G^{21}V^{21}\|_F}{2\|H^{21}V^{11}\|_F + \sigma_2^2} \quad (16)$$

$$= \frac{\|H^{11}V^{11}\|_F + \|G^{11}V^{11}\|_F}{2\|H^{21}V^{11}\|_F + \sigma_2^2} \cdot \frac{\|H^{21}V^{21}\|_F + \|G^{21}V^{21}\|_F}{2\|H^{11}V^{21}\|_F + \sigma_1^2}$$

According to an embodiment, in equation (16), the geometric mean has been rearranged into a multiplication of two non-negative terms, where each is only relevant to precoding matrixes $V^{11}$ and $V^{21}$ respectively. Therefore each term may be optimized equivalently with respect to each of the individually corresponding precoding matrixes. In an embodiment, the precoding matrixes $V^{11}$ and $V^{21}$ are expanded in vector forms i.e. $V^{11} = [u_1 \ldots u_M]$ and $V^{21} = [v_1 \ldots v_M]$, where $u_m$ and $v_m$ (m=1 ... M) are M×1 precoding vectors for a $m^{th}$ data element of $x^{11}$ and $x^{21}$ respectively. According to an embodiment, this arrives at two sub optimization problems:

$$\max_{u_1 \ldots u_M \in \mathbb{C}^{M \times 1}} \frac{\sum_{m=1}^{M} u_m^H R_1 u_m}{\sum_{m=1}^{M} u_m^H Q_1 u_m} \quad (17)$$

$$\text{s.t. } u_m^H Q_1 u_k = 0 \ (m \neq k) \quad (18)$$

$$u_m^H Q_1 u_m = \alpha_m \ (m = 1 \ldots M) \quad (19)$$

$$\max_{v_1 \ldots v_M \in \mathbb{C}^{M \times 1}} \frac{\sum_{m=1}^{M} v_m^H R_2 v_m}{\sum_{m=1}^{M} v_m^H Q_2 v_m} \quad (20)$$

$$\text{s.t. } v_m^H Q_2 v_k = 0 \ (m \neq k) \quad (21)$$

$$v_m^H Q_2 u_m = \beta_m \ (m = 1 \ldots M) \quad (22)$$

where $$R_1 \triangleq (H^{11})^H H^{11} + (G^{11})^H G^{11}, R_2 \triangleq (H^{21})^H H^{21} + (G^{21})^H G^{21},$$

$$Q_1 \triangleq 2(H^{21})^H H^{21}, \text{ and } Q_2 \triangleq 2(H^{11})^H H^{11}.$$

$\alpha_m$ and $\beta_m$ are the power regulators for the first base station 302 and the second base station 304 respectively. Without a loss of generality, they are arranged in a descending order, i.e. $\alpha_1 \geq \ldots \geq \alpha_M$ and $\beta_1 \geq \ldots \geq \beta_M$. In other words, the power regulator $\alpha_1$ for a first data stream includes a highest power in the distribution as compared to other data streams in the signal channel, then progressively less for each subsequent data stream.

According to an embodiment, the constraints provided in equations (18) and (21) provide a full rank precoding matrix with maximum multiplexing gains, and minimal decoding complexity, with orthogonality, at the receivers 312 and 314. As a representative example, without the constraints, the optimal vectors $u_m$ (or $v_m$) would be identical for m=1 ... M, which may lead to a deficient precoding matrix that fails to achieve a maximum multiplexing gain. As a further representative example, if different precoding vectors are not $Q_1$-orthogonal as provided in equation (18) or $Q_2$-orthogonal as provided in equation (21), the receivers 312 and 314 will experience interference amongst data streams from a same base station and may have to introduce additional complexity in order to address the interference.

In an embodiment, an objective function of the sub optimization equations in (17) or (20) is a further generalization of a Generalized Rayleigh Quotient, which has only one vector variable. A close-form solution of this type of generalized Rayleigh quotient can be obtained through applying Lagrange conditions. The detailed derivation is provided as such, wherein a generalized Rayleigh Quotient can be shown as:

$$\Delta(u_1 \ldots u_M) \triangleq \frac{\sum_{m=1}^{M} u_m^H R_1 u_m}{\sum_{m=1}^{M} u_m^H Q_1 u_m} \quad (22)$$

and the Lagrangian function shown as:

$$L(u_m, \mu_m, \delta_{m,k}) = \quad (23)$$

$$\Delta - \sum_{m=1}^{M} \mu_m(u_m^H Q_1 u_m - \alpha_m) - \sum_{\substack{1 \le m,k \le M \\ m \ne k}} \delta_{m,k}(u_m^H Q_1 u_k u_k^H Q_1 u_m)$$

where $\mu_m$ and $\delta_{m,k}$ are Lagrange multipliers. Applying Lagrange conditions and some manipulations yield that the stationary points of $\Delta$ are generalized eigenvectors of the matrix pair $(R_1, Q_1)$ and $$\Delta = \frac{\sum_{m=1}^{M} \alpha_m \lambda_{i_m}}{\sum_{m=1}^{M} \alpha_m} \quad (24)$$

where $\lambda_{i_m}$ is a generalized eigenvalue and $(i_1 \ldots i_M)$ is a permutation of $(1 \ldots M)$. According to an embodiment, it can be relatively straightforward to verify that the generalized Rayleigh quotient in (24) is maximized when $\lambda_{i_m}$ is arranged in a descending order such as $\alpha_m$, i.e. $\lambda_{i_1} = \lambda_1 \ge \ldots \ge \lambda_{i_M} = \lambda_M$. The derivation is concluded with such a determination. The sub-optimization equations formulated in (17) or (20) can be dealt with similarly.

Returning back, according to an embodiment, the optimal precoding matrixes for $V^{11}$ and $V^{21}$ can be shown respectively as:

$$U^O = [u_1^O \ldots u_M^O] \quad (25)$$

$$V^O = [v_1^O \ldots v_M^O] \quad (26)$$

where $u_1^O \ldots u_M^O$ and $v_1^O \ldots v_M^O$ are the generalized eigenvectors of $(R_1, Q_1)$ and $(R_2, Q_2)$ respectively, both corresponding to the eigenvalues arranged in a descending order. In an embodiment, the maximized generalized Rayleigh Quotients as derived from equations (17) and (20) can then be shown as:

$$\Delta_1 = \frac{\sum_{m=1}^{M} \alpha_m \lambda_m}{\sum_{m=1}^{M} \alpha_m} \quad (m = 1 \ldots M) \quad (27)$$

$$\Delta_2 = \frac{\sum_{m=1}^{M} \beta_m \varepsilon_m}{\sum_{m=1}^{M} \beta_m} \quad (m = 1 \ldots M) \quad (28)$$

where $\lambda_m$ and $\epsilon_m$, where (m=1 ... M) are the generalized eigenvalues of $(R_1, Q_1)$ and $(R_2, Q_2)$ respectively and both are arranged in descending orders as with $\alpha_m$ and $\beta_m$.

In an embodiment, a determination is made of power regulators $\alpha_m$ and $\beta_m$ where (m=1 ... M), as originated in equations (19) and (22).

According to an embodiment, $$I_\alpha = \sum_{m=1}^{M} \alpha_m \text{ and } I_\beta = \sum_{m=1}^{M} \beta_m,$$

which are normalized as according to maximum power constraints. With respect to equations (27) and (28), the optimal geometric mean in (16) can be achieved as:

$$snr^{[1]} \cdot snr^{[2]} = \frac{\sum_{m=1}^{M} \alpha_m \lambda_m}{I_\alpha + \sigma_2^2} \cdot \frac{\sum_{m=1}^{M} \beta_m \varepsilon_m}{I_\beta + \sigma_1^2} \quad (29)$$

According to an embodiment, as $\alpha_m$, $\lambda_m$, $\beta_m$, $\epsilon_m$ where (m=1 ... M) are all arranged in descending order, it can be verified that the optimal power distribution strategy is to allocate as much power as possible to the smallest index m (largest eigenvalues), given $I_\alpha$ and $I_\beta$ and pairs of $(R_1, Q_1)$ and $(R_2, Q_2)$ or $\lambda_m$ and $\epsilon_m$. In an embodiment, a representative example can be a case where $\alpha_1 = I_\alpha$, $\alpha_2 = \ldots = \alpha_M = 0$ and $\beta_1 = I_\beta$, $\beta_2 = \ldots = \beta_M = 0$. However, such a case would not be a valid solution to the presently considered condition. In an embodiment, in order to achieve the maximized multiplexing gains, all of $\alpha_m$ and $\beta_m$ should not be zero.

Further, according to an embodiment, the power regulators $\alpha_m$ and $\beta_m$ are determined for sufficient power in a data transmission such that a received signal or transmission from any one of the first base station and the second base station at any one of the first mobile station and the second mobile station can be demodulated in accordance to a network modulation scheme. For example, in a LTE cellular network, a Quadrature phase-shift keying (QPSK) is used for modulation of a transmission signal.

According to an embodiment, the values of $\alpha_m$ and $\beta_m$ fulfill the following constraints in order to achieve the maximized multiplexing gain:

$$snr_m^{[1]} = \frac{\alpha_m \lambda_m}{I_\beta + \sigma_1^2} \ge \gamma_m^{[1]} \quad (30)$$

$$snr_m^{[2]} = \frac{\beta_m \varepsilon_m}{I_\alpha + \sigma_2^2} \ge \gamma_m^{[2]}$$

or equivalently:

$$\alpha_m \ge (\gamma_m^{[1]}/\lambda_m)(I_\beta + \sigma_1^2)$$

$$\beta_m \ge (\gamma_m^{[2]}/\epsilon_m)(I_\alpha + \sigma_2^2) \quad (31)$$

where $snr_m^{[1]}$ and $snr_m^{[2]}$ where (m=1 ... M) are the SNR per data stream originating from the first base station 302 and the second base station 304 respectively, and $\gamma_m^{[1]}$ and $\gamma_m^{[2]}$ are required SNR values for a $m^{th}$ data stream originating from the first base station 302 and the second base station 304 respectively.

According to an embodiment, the required SNR $\gamma_m$ refers to the receiver sensitivity for a specific modulation. For example, for a QPSK signal transmission, a receiver will only be able to decode a signal when the signal SNR at receiver is higher than a specific SNR value, i.e. sensitivity.

The required SNR value $\gamma_m$ is implementation dependent. It may vary from device to device and products from different manufacturers may have different values. Normally, products from same manufacturer for the same standard products have the same SNR values for a specific modulation and coding rate.

In an embodiment, the values of $\alpha_m$ and $\beta_m$ where (m=2 . . . M) in (31) can be set to satisfy the minimum requirement of $snr_m^{[1]}$ and $snr_m^{[2]}$ corresponding to a lowest modulation and coding rate. In the embodiment, all the remaining power will then be allocated to $\alpha_1$ and $\beta_1$. According to an embodiment, if there is available power headroom in the achieving of the highest modulation and coding rate without using up all the available power, any additional power can be overflowed to the next streams, i.e., in increasing $\alpha_2$ and $\beta_2$. This process can continue until all the power is allocated or all data streams achieve a maximum modulation and coding rate.

According to an embodiment, the determined power regulators, $\alpha_m$ and $\beta_m$, the determined eignvalues $\lambda_m$ and $\epsilon_m$, the determined SNR, $snr_m$, and the generalized eigenvectors of $(R_1, Q_1)$ and $(R_2, Q_2)$ can be used to determine an optimal precoding matrix for $V^{11}$ and $V^{21}$. Thereafter, as according to equations (7), the precoding matrix for $V^{12}$ and $V^{22}$ are generated for application to thus provide an optimal signal transmission from the first base station 302 and the second base station 304 to the first mobile station 312 and the second mobile station 314.

Figure 4:
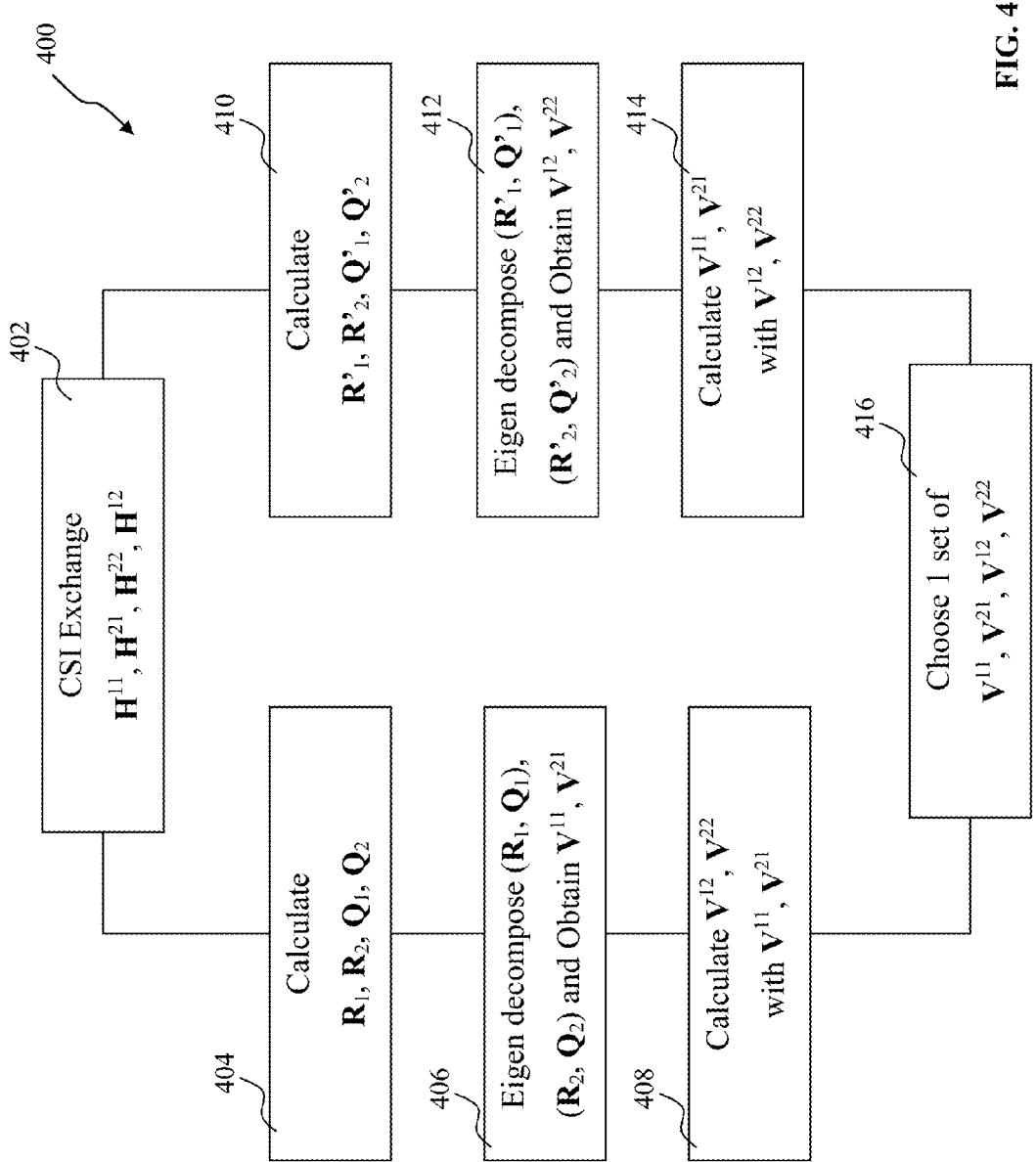
FIG. 4 illustrates a flow chart of an optimization according to an embodiment.

FIG. 4 illustrates a flow chart 400 of an optimization according to an embodiment. Flow chart 400 provides an optimized method in determining precoding matrixes for improved signal transmission through a base station cooperation. In 402, a CSI exchange is carried out between the first base station 302 and the second base station 304. As earlier indicated, the CSI exchange facilitates base station cooperation, and includes a minimal or reduced data information load sharing between the base stations in cooperation. In 404, $R_1$, $R_2$, $Q_1$, $Q_2$ are calculated or determined in obtaining an optimized base station cooperation according to an embodiment. In determining R and Q, Interference Alignment is carried out, with a view to attain maximum multiplexing gains and minimal decoding complexity, at the receivers.

In 406, an eigen-decomposition of $(R_1, Q_1)$ and $(R_2, Q_2)$ is carried out. According to an embodiment, an optimization of SNR and a determination of power regulators, thus leading to a maximization of system SNR, is sought in the decomposition of R and Q Additionally, in an embodiment, an optimized precoding matrix is thereafter obtained for $V^{11}$ and $V^{21}$. In 408, $V^{12}$ and $V^{22}$ are generated or calculated based on the obtained optimized precoding matrixes $V^{11}$ and $V^{21}$.

According to an embodiment, an optimized set of precoding matrixes is obtained based on the first base station 302 in a base station cooperation with a second base station 304 in transmission communication with a first mobile station 312 and a second mobile station 314. In an embodiment, optimized precoding matrixes $V^{11}$ and $V^{21}$ are determined, which relate to codewords $x^{11}$ and $x^{21}$ for a signal vector $x^{[1]}$ for a signal transmission from the first base station 302 to the first mobile station 312 and the second mobile station 314. Optimized precoding matrixes $V^{12}$ and $V^{22}$ can thereafter be generated based on $V^{11}$ and $V^{21}$, which relate to codewords $x^{12}$ and $x^{22}$ for a signal vector $x^{[2]}$ for a signal transmission from the second base station 302 to the first mobile station 312 and the second mobile station 314. A first set of optimized precoding matrixes ($V^{11}$, $V^{21}$, $V^{12}$ and $V^{22}$) is thus obtained.

In an embodiment, a set of optimized precoding matrixes can instead be obtained by first determining optimized precoding matrixes for signal transmission from the second base station 304, and thereafter generating optimized precoding matrixes for signal transmission from the first base station 305.

According to an embodiment, in 410, $R'_1$, $R'_2$, $Q'_1$, $Q'_2$ are calculated or determined in obtaining an optimized base station cooperation according to an embodiment. In 412, an eigen-decomposition of $(R'_1, Q'_1)$ and $(R'_2, Q'_2)$ is carried out. Further, an optimized precoding matrix is thereafter obtained for $V^{12}$ and $V^{22}$. In 414, $V^{11}$ and $V^{21}$ are generated or calculated based on the obtained optimized precoding matrixes $V^{12}$ and $V^{22}$. A second set of optimized precoding matrixes ($V^{12}$, $V^{22}$, $V^{11}$ and $V^{21}$) is thus obtained In an embodiment, a set of optimized precoding matrixes for a first base station and a second base station can be determined by carrying out a comparison of the first set of optimized precoding matrixes and the second set of optimized precoding matrixes. In 416, one set of optimized precoding matrixes for $V^{12}$, $V^{22}$, $V^{11}$ and $V^{21}$ is chosen. According to an embodiment, the selection of the set of optimized precoding matrixes can be performed by calculating SNRs at the receivers, e.g. using (15), (16), or geometry mean of all 4 SNRs, $snr^{[1]}$, $snr^{[2]}$, $snr^{[3]}$, and $snr^{[4]}$, where $snr^{[3]}$ and $snr^{[4]}$ are calculated similarly as in (15).

According to another embodiment, the first set of optimized precoding matrixes is elected for use by the first base station and the second base station in a transmission to a first mobile station and/or a second mobile station. An actual reading of a first SNR at the first mobile station or the second mobile station for data received from the base stations is obtained, based on the first set of optimized precoding matrixes. A similar data transmission run is carried out based on the second set of optimized precoding matrixes and a second actual reading of a second SNR for data received is obtained. A comparison is then made between the first SNR and the second SNR and a choice is made on using any one of the first set of optimized precoding matrixes and the second set of optimized precoding matrixes. It is noted that in a method according to various embodiments in the present disclosure, there is no further requirement of feedback or measurement readings from the mobile stations in carrying out a base station cooperation.

Such a comparative selection allows for maximization of SNRs at the receivers. According to an embodiment, in a 2×2 system, there are four precoding matrixes wherein two of which are optimized in terms of resulting receiving SNR at the receivers whereas the other two precoding matrixes are determined through interference alignment constraints, and which are not optimized in terms of SNR maximization. Through alternating the precoding matrixes to be optimized and selecting the best afterwards, best possible precoding matrixes can be obtained.

According to an embodiment, in verification of the determined parameters in supporting base station cooperation, a downlink transmission of the first base station 302 and the second base station 304 is considered for simulation. The first base station 302 and the second base station 304 cooperatively serve two mobiles stations—the first mobile station 312 and the second mobile station 314, at a time and with a shared frequency bandwidth, for example, in allocation of a certain number of resource blocks. In an embodiment, each station is equipped with 4 antennas, both transmitting and receiving; the channel is also assumed Rayleigh fading.

According to an embodiment, the first mobile station 312 includes a first detection module 342 and the second mobile station 314 includes a second detection module 344. The first detection module 342 and the second detection module 344 are used in an embodiment to determine a resultant signal from the first base station 302 and the second base station 304. The resultant signals are thereafter used in a verification or in an observation of simulation results.

Figure 5A:
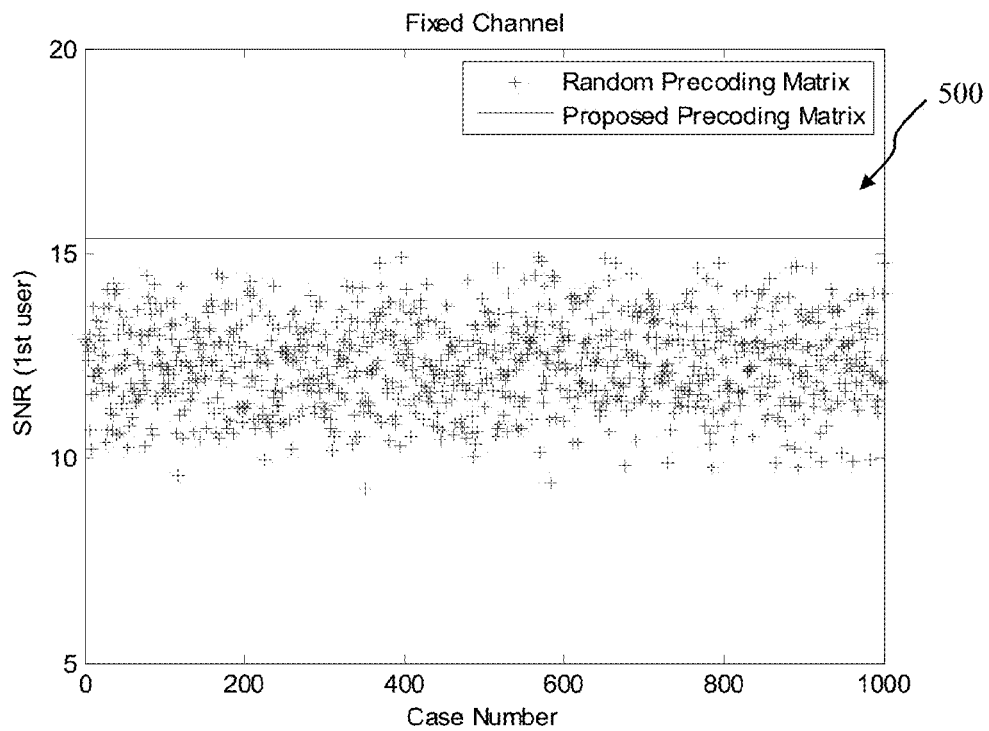
FIG. 5A shows the results of a first set of simulations according to an embodiment.
Figure 5B:
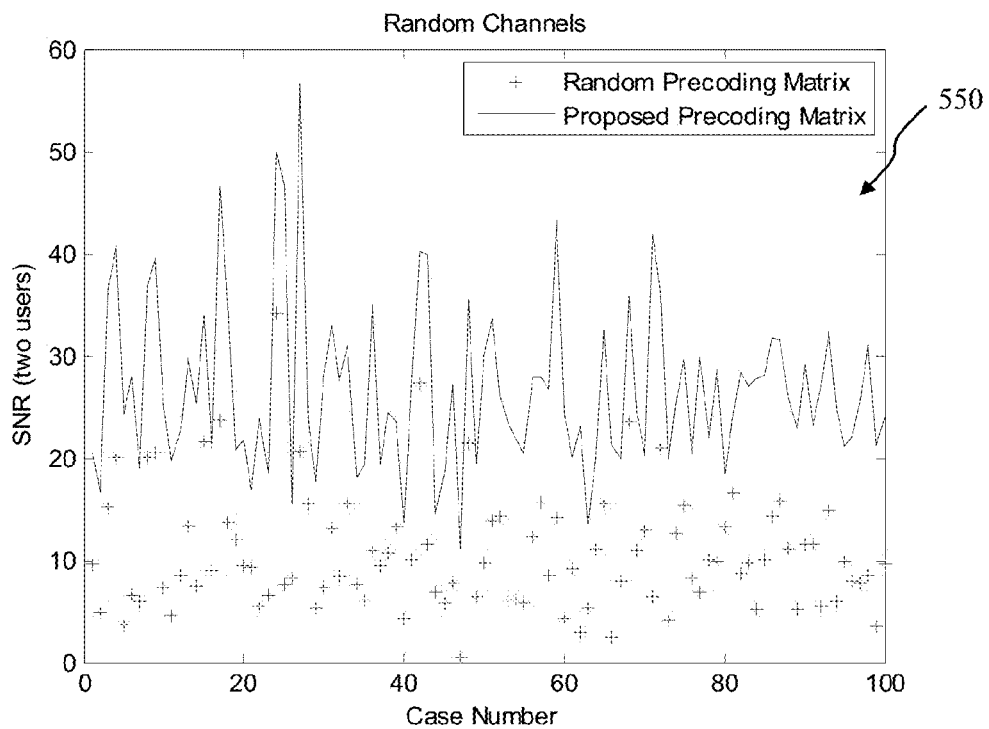
FIG. 5B shows the results of a second set of simulations according to an embodiment.

FIG. 5A shows the results of a first set of simulations 500 according to an embodiment. In the first set of simulations 500, results are taken with respect to a first mobile station, and the fading channel matrix is assumed unchanged during different runs of the simulation. FIG. 5B shows the results of a second set of simulations 550 according to an embodiment. In the second set of simulations 550, results are taken with respect to a first mobile station and a second mobile station, and the fading channel matrixes are varying from one simulation run to another. 500 and 550 both show the simulation results for the receiver SNRs with different precoding—a random precoding matrix and a proposed precoding matrix as according to various embodiments in the present disclosure.

It can be clearly observed that a proposed precoding according to various embodiments in the present disclosure outperforms a random precoding scheme significantly, with a few to tens of dB in SNR margins.

According to an embodiment, a precoding design is provided for interference alignment in X channels. The precoding matrixes are optimized to achieve maximized geometric mean of users' signal-to-noise ratios. The multiplexing gain is maximized at the same time. This transmission can achieve significant improvement in throughput without the need of exchanging real-time data amongst base stations.

In an embodiment, the obtaining or determination or calculation of parameters in supporting base station cooperation between the first base station 302 and the second base station 304 is carried out in a central unit electrically and communicatively coupled to both the first base station 302 and the second base station 304. The central unit can include a processor, a memory or a data storage medium, and multiple inputs and outputs for receiving and transmitting statistical information and control instructions to the first base station 302 and the second base station 304 or a further plurality of base stations. Further, the central unit includes a plurality of functional modules configured to determine parameters in supporting base station cooperation.

In another embodiment, the obtaining or determination or calculation of parameters in supporting base station cooperation between the first base station 302 and the second base station 304 is carried out respectively in each of the first base station 302 and the second base station 304, where the base stations are electrically and communicatively coupled to each other. The first base station 302 and the second base station 304 can each include a processor, a memory or a data storage medium, and multiple inputs and outputs for receiving and transmitting statistical information and control instructions to or from a plurality of base stations or a core network. The first base station 302 and the second base station 304 can respectively include a plurality of functional modules configured to determine parameters in supporting base station cooperation.

In an embodiment, the presented method of determining parameters in supporting base station cooperation is carried out in a long term channel. In an embodiment, the long term channel is a channel that is carried out in a 1 millisecond. In an embodiment, the long term channel is provided for 1 second. In an embodiment, the long term channel is provided for 1 minute. In an embodiment, there is provided a frame for which a channel is constant. A method of base station cooperation according to an embodiment is carried out in a frame of a communications channel in which the channel is constant.

Figure 6:
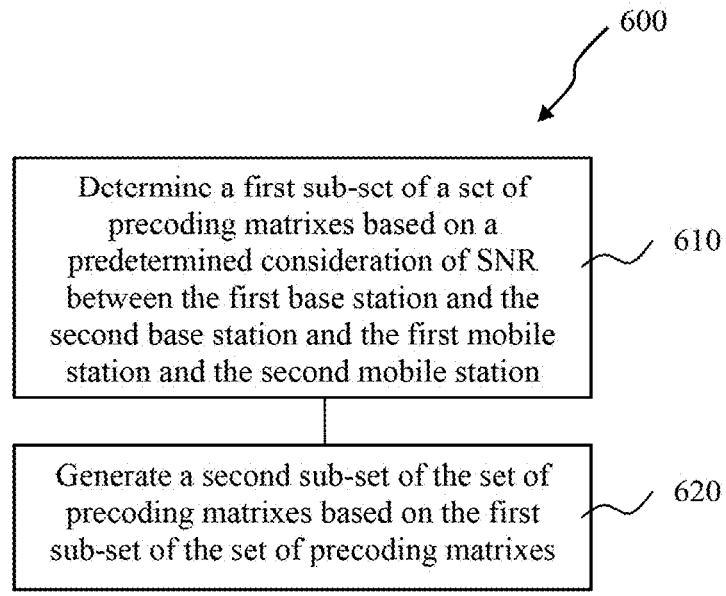
FIG. 6 illustrates a block diagram of a method according to an embodiment of the present disclosure.

FIG. 6 illustrates a block diagram of a method 600 according to an embodiment of the present disclosure. Method 600 can be a method for determining precoding matrixes for a communication of a first base station and a second base station with a first mobile station and a second mobile station, the communication including: a first signal channel between the first base station and the first mobile station, a second signal channel between the first base station and the second mobile station, a third signal channel between the second base station and the first mobile station, and a fourth signal channel between the second base station and the second mobile station. In 610, the method can include determining a first sub-set of a set of precoding matrixes based on a predetermined consideration of SNR between the first base station and the second base station and the first mobile station and the second mobile station, the set of precoding matrixes including a first precoding matrix for the first signal channel, a second precoding matrix for the second signal channel, a third precoding matrix for the third signal channel and a fourth precoding matrix for the fourth signal channel. In 620, the method can include generating a second sub-set of the set of precoding matrixes based on the first sub-set of the set of precoding matrixes.

In an embodiment, a first sub-set of the set of precoding matrixes is deliberately determined, based at least on a SNR consideration of transmission received at the first mobile station and the second mobile station. This is in comparison with simply generating a random first set of precoding matrixes and aligning for interference therefrom. With such a determination as in an embodiment, optimization for noise as well as for interference can be carried out in a single optimization run.

In an embodiment, a closed form method is provided for obtaining a collection of precoding matrixes for a base station cooperation. It is noted that such a method carries out no repeated iteration of algorithms in achieving an optimization. In such a case, bandwidth and valuable processing time is saved and focus is instead paid to the carrying out of a base station cooperation MIMO communication arrangement data transmission.

In an embodiment, determining the first set of precoding matrixes includes determining any two precoding matrixes from the set of precoding matrixes based on the predetermined consideration of a signal to noise ratio between the first base station and the second base station and the first mobile station and the second mobile station. Further, generating the second set of precoding matrixes includes generating the second sub-set comprises generating the remaining two precoding matrixes from the set of precoding matrixes based on the first sub-set.

In an embodiment, determining the first set of precoding matrixes includes determining the first precoding matrix and the second precoding matrix based on the predetermined consideration of a signal to noise ratio between the first base station and the second base station and the first mobile station and the second mobile station. Further, generating the second set of precoding matrixes includes generating the second sub-set comprises generating the third precoding matrix and the fourth precoding matrix based on the first sub-set.

In an embodiment, the method further includes determining a third sub-set of the set of precoding matrixes including a fifth precoding matrix for the third signal channel and a sixth precoding matrix for the fourth signal channel, based on the predetermined consideration of SNR between the first base station and the second base station and the first mobile station and the second mobile station; and generating a fourth sub-set of the set of precoding matrixes including a seventh precoding matrix for the first signal channel and an eighth precoding matrix for the second signal channel based on the fifth precoding matrix and the sixth precoding matrix.

In an embodiment, the method further includes selecting for use between a first collection of precoding matrixes comprising the first sub-set and the second sub-set of the set of precoding matrixes, and a second collection of precoding matrixes comprising the third sub-set and the fourth sub-set of the set of precoding matrixes, based on a SNR measurement at any one of the first mobile station and the second mobile station for signal transmission carried out based on each of the first collection of precoding matrixes and the second collection of precoding matrixes.

In an embodiment, the first sub-set includes the first precoding matrix and the third precoding matrix, and the second sub-set includes the second precoding matrix and the fourth precoding matrix.

In an embodiment, the first sub-set includes the first precoding matrix and the fourth precoding matrix, and the second sub-set includes the second precoding matrix and the third precoding matrix.

In an embodiment, the method further includes generating the second set of precoding matrixes based on an interference alignment process considering the first set of precoding matrixes.

In an embodiment, the interference alignment process includes improving multiplexing gain in the MIMO communication arrangement between the first base station and the second base station and the first mobile station and the second mobile station.

In an embodiment, the predetermined consideration of SNR further includes a consideration of a first SNR at the first mobile station and a second SNR at the second mobile station in determining the first sub-set of precoding matrixes.

In an embodiment, the predetermined consideration of SNR further includes obtaining any one of a geometric mean, a sum rate, an equal rate and a minimum mean square error of a first SNR and a second SNR.

In an embodiment, the predetermined consideration of SNR further includes maximizing any one of a geometric mean, a sum rate, an equal rate and a minimum mean square error of a first SNR and a second SNR.

In an embodiment, the method includes obtaining eigenvalues with a generalized Rayleigh Quotient in determining the first set of precoding matrixes.

In an embodiment, Lagrange conditions are applied to the generalized Rayleigh Quotient in determining the first set of precoding matrixes.

In an embodiment, the method includes optimizing a power distribution for a plurality of data streams in any one of the first signal channel and the second signal channel, the power distribution based on a network capacity in the MIMO arrangement derived from the first sub-set of precoding matrixes.

In an embodiment, the method includes determining a value of a power regulator for each of the plurality of data streams based on a modulation and a coding rate in optimizing the power distribution.

In an embodiment, the method includes determining a value of a power regulator for one of the plurality of data streams based on a lowest modulation and a lowest coding rate.

In an embodiment, the method includes determining values of power regulators of all but one of the plurality of data streams based on a lowest modulation and a lowest coding rate.

In an embodiment, the value of a power regulator of the remaining one of the plurality of data streams is determined based on allocating a remaining power from the network capacity.

In an embodiment, the method includes adjusting the value of the power regulator of a subsequent data stream originating from any one of the first base station and the second base station to allocate any remaining power from the network capacity for distribution.

In an embodiment, the method includes distributing power in a descending order in the plurality of data streams.

In an embodiment, the first precoding matrix includes a 3M×3M block matrix and the method further includes determining the first precoding matrix includes optimizing the first precoding matrix three times in a M×M sub-block.

Figure 7:
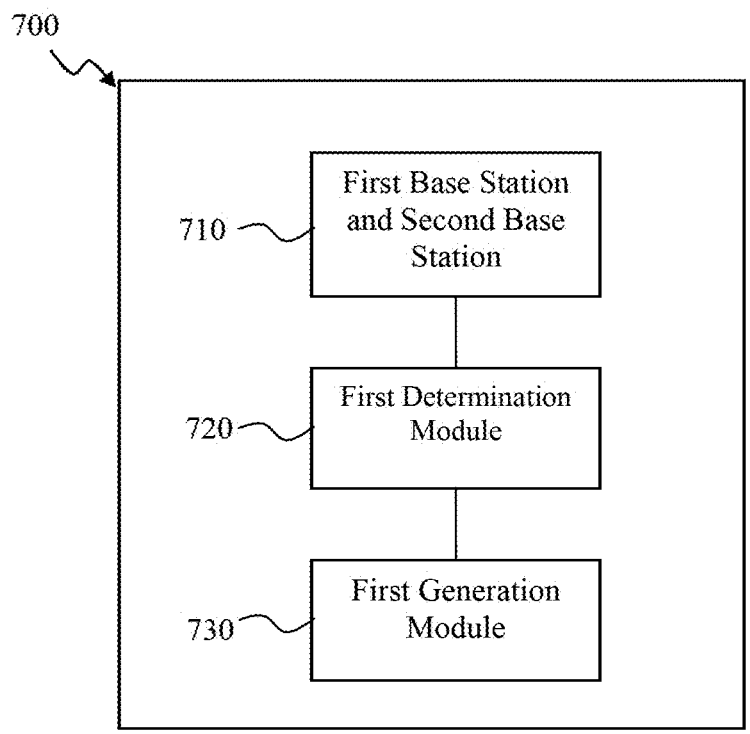
FIG. 7 illustrates a schematic of a system according to an embodiment of the present disclosure.

In an embodiment, the method includes optimizing the first precoding matrix and the second precoding matrix based on a desired signal power, an interference power and a noise variance at any one of the first mobile station and the second mobile station in determining the first sub-set of precoding matrixes. FIG. 7 illustrates a schematic of a system 700 according to an aspect of the present disclosure. In 710, the system can include a first base station and a second base station, for communication with a first mobile station and a second mobile station, the communication including: a first signal channel between the first base station and the first mobile station, a second signal channel between the first base station and the second mobile station, a third signal channel between the second base station and the first mobile station, and a fourth signal channel between the second base station and the second mobile station. In 720, the system can include a first determination module configured to determine a first sub-set of a set of precoding matrixes based on a predetermined consideration of SNR between the first base station and the second base station and the first mobile station and the second mobile station, the set of precoding matrixes including a first precoding matrix for the first signal channel, a second precoding matrix for the second signal channel, a third precoding matrix for the third signal channel and a fourth precoding matrix for the fourth signal channel.

In 730, the system can include a first generation module configured to generate a second sub-set of the set of precoding matrixes based on the first sub-set of the set of precoding matrixes.

In an embodiment, the first determination module is configured to determine any two precoding matrixes from the set of precoding matrixes based on the predetermined consideration of a signal to noise ratio between the first base station and the second base station and the first mobile station and the second mobile station. Further, the first generation module is configured to generate the remaining two precoding matrixes from the set of precoding matrixes based on the first sub-set.

In an embodiment, the first determination module is configured to determine the first precoding matrix and the second precoding matrix based on the predetermined consideration of a signal to noise ratio between the first base station and the second base station and the first mobile station and the second mobile station. Further, the first generation module is configured to generate the third precoding matrix and the fourth precoding matrix based on the first sub-set.

In an embodiment, the system includes a second determination module configured to determine a third sub-set including a fifth precoding matrix for the third signal channel and a sixth precoding matrix for the fourth signal channel, based on the predetermined consideration of SNR between the first base station and the second base station and the first mobile station and the second mobile station; and a second generation module configured to generate a fourth sub-set including a seventh precoding matrix for the first signal channel and an eighth precoding matrix for the second signal channel based on the fifth precoding matrix and the sixth precoding matrix.

Alternatively, the first determination module and the first generation module can be configured to determine the fifth precoding matrix and the sixth precoding matrix, and the seventh precoding matrix and the eighth precoding matrix respectively.

In an embodiment, the system includes a selector module configured to select for use between a first collection of precoding matrixes comprising the first sub-set and the second sub-set, and a second collection of precoding matrixes comprising the third sub-set and the fourth sub-set, based on a SNR measurement at any one of the first mobile station and the second mobile station for signal transmission carried out based on each of the first collection of precoding matrixes and the second collection of precoding matrixes.

In an embodiment, the first sub-set includes the first precoding matrix and the third precoding matrix, and the second sub-set includes the second precoding matrix and the fourth precoding matrix.

In an embodiment, the first sub-set includes the first precoding matrix and the fourth precoding matrix, and the second sub-set includes the second precoding matrix and the third precoding matrix.

In an embodiment, the first generation module is configured to generate the second sub-set based on an interference alignment process considering the first sub-set.

In an embodiment, the interference alignment process includes improving multiplexing gain in the MIMO communication arrangement between the first base station and the second base station and the first mobile station and the second mobile station.

In an embodiment, the predetermined consideration of SNR further includes a consideration of a first SNR at the first mobile station and a second SNR at the second mobile station to determine the first sub-set.

In an embodiment, the predetermined consideration of SNR further includes obtaining any one of a geometric mean, a sum rate, an equal rate and a minimum mean square error of a first SNR and a second SNR.

In an embodiment, the predetermined consideration of SNR further includes maximizing any one of a geometric mean, a sum rate, an equal rate and a minimum mean square error of a first SNR and a second SNR.

In an embodiment, the first determination module is configured to further obtain eigenvalues with a generalized Rayleigh Quotient to determine the first set of precoding matrixes.

In an embodiment, Lagrange conditions are applied to the generalized Rayleigh Quotient to determine the first set of precoding matrixes.

In an embodiment, the first determination module is configured to optimize a power distribution for a plurality of data streams in any one of the first signal channel and the second signal channel, the power distribution based on a network capacity in the MIMO arrangement derived from the first sub-set.

In an embodiment, the first determination module is configured to determine a value of a power regulator for each of the plurality of data streams based on a modulation and a coding rate in optimizing the power distribution.

In an embodiment, the first determination module is configured to determine a value of a power regulator for one of the plurality of data streams based on a lowest modulation and a lowest coding rate.

In an embodiment, the first determination module is configured to determine values of power regulators of all but one of the plurality of data streams based on a lowest modulation and a lowest coding rate.

In an embodiment, the value of a power regulator of the remaining one of the plurality of data streams is determined based on allocating a remaining power from the network capacity.

In an embodiment, the first determination module is configured to adjust the value of the power regulator of a subsequent data stream originating from any one of the first base station and the second base station to allocate any remaining power from the network capacity for distribution.

In an embodiment, the first determination module is configured to distribute power in a descending order in the plurality of data streams.

In an embodiment, the first precoding matrix includes a 3M×3M block matrix and wherein the first determination module is configured to optimize the first precoding matrix three times in a M×M sub-block to determine the first precoding matrix.

In an embodiment, the first determination module is configured to optimize the first precoding matrix and the second precoding matrix based on a desired signal power, an interference power and a noise variance at any one of the first mobile station and the second mobile station to determine the first sub-set.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for determining precoding matrixes for a communication of a first base station and a second base station with a first mobile station and a second mobile station, the communication comprising:

a first signal channel between the first base station and the first mobile station, a second signal channel between the first base station and the second mobile station, a third signal channel between the second base station and the first mobile station, and a fourth signal channel between the second base station and the second mobile station, the method comprising:

determining a first sub-set of a set of precoding matrixes based on a predetermined consideration of a signal to noise ratio (SNR) between the first and second base stations and the first and second mobile stations, the set of precoding matrixes comprising a first precoding matrix for the first signal channel, a second precoding matrix for the second signal channel, a third precoding matrix for the third signal channel and a fourth precoding matrix for the fourth signal channel; and generating a second sub-set of the set of precoding matrixes based on the first sub-set of the set of precoding matrixes determined such that the first and second sub-sets satisfy a predetermined condition for interference alignment at the first and second mobile stations, wherein the predetermined consideration of SNR comprises a consideration of a first SNR at the first mobile station and a second SNR at the second mobile station in determining the first sub-set for optimizing the first sub-set with respect the first SNR at the first mobile station and the second SNR at the second mobile station.

2. The method according to claim 1, wherein:
determining the first sub-set comprises determining any two precoding matrixes from the set of precoding matrixes based on the predetermined consideration of a SNR between the first and second base stations and the first and second mobile stations; and
generating the second sub-set comprises generating the remaining two precoding matrixes from the set of precoding matrixes based on the first sub-set.

3. The method according to claim 2, wherein:
determining the first sub-set comprises determining the first precoding matrix and the second precoding matrix based on the predetermined consideration of a SNR between the first and second base stations and the first and second mobile stations; and
generating the second sub-set comprises generating the third precoding matrix and the fourth precoding matrix based on the first sub-set.

4. The method according to claim 3, further comprising:
determining a third sub-set of the set of precoding matrixes comprising a fifth precoding matrix for the third signal channel and a sixth precoding matrix for the fourth signal channel, based on the predetermined consideration of a SNR between the first and second base stations and the first and second mobile stations; and
generating a fourth sub-set of the set of precoding matrixes comprising a seventh precoding matrix for the first signal channel and an eighth precoding matrix for the second signal channel based on the fifth precoding matrix and the sixth precoding matrix.

5. The method according to claim 4, further comprising selecting between a first collection of precoding matrixes comprising the first sub-set and the second sub-set, and a second collection of precoding matrixes comprising the third sub-set and the fourth sub-set, based on a SNR measurement at any one of the first mobile station and the second mobile station for signal transmission carried out based on each of the first collection of precoding matrixes and the second collection of precoding matrixes.

6. The method according to claim 3, further comprising optimizing a power distribution for a plurality of data streams in any one of the first signal channel and the second signal channel, the power distribution based on a network capacity in the MIMO arrangement derived from the first sub-set.

7. The method according to claim 6, further comprising determining a value of a power regulator for each of the plurality of data streams based on a modulation and a coding rate in optimizing the power distribution.

8. The method according to claim 7, further comprising determining a value of a power regulator for one of the plurality of data streams based on a lowest modulation and a lowest coding rate.

9. The method according to claim 8, further comprising determining values of power regulators for each of the plurality of data streams except one thereof based on a lowest modulation and a lowest coding rate.

10. The method according to claim 9, wherein the value of a power regulator for the remaining one of the plurality of data streams is determined based on allocating a remaining power from the network capacity.

11. The method according to claim 10, further comprising adjusting the value of the power regulator for a subsequent data stream originating from any one of the first base station and the second base station to allocate any remaining power from the network capacity for distribution.

12. The method according to claim 6, further comprising distributing power in a descending order in the plurality of data streams.

13. The method according to claim 1, wherein the predetermined condition for interference alignment is for improving multiplexing gain in the multiple-input multiple-output (MIMO) communication arrangement between the first and second base stations and the first and second mobile stations.

14. The method according to claim 1, wherein the predetermined consideration of SNR further comprises obtaining any one of a geometric mean, a sum rate, an equal rate and a minimum mean square error of a first SNR and a second SNR.

15. The method according to claim 14, wherein the predetermined consideration of SNR further comprises maximizing any one of a geometric mean, a sum rate, an equal rate and a minimum mean square error of a first SNR and a second SNR.

16. The method according to claim 1, further comprising obtaining eigenvalues with a generalized Rayleigh Quotient in determining the first sub-set of precoding matrixes.

17. The method according to claim 16, wherein Lagrange conditions are applied to the generalized Rayleigh Quotient in determining the first sub-set of precoding matrixes.

18. A system comprising:
a first base station and a second base station, for communication with a first mobile station and a second mobile station, the communication comprising:
a first signal channel between the first base station and the first mobile station, a second signal channel between the first base station and the second mobile station, a third signal channel between the second base station and the first mobile station, and a fourth signal channel between the second base station and the second mobile station;
a first determination module configured to determine a first sub-set of a set precoding matrixes based on a predetermined consideration of a signal to noise ratio (SNR) between the first and second base stations and the first and second mobile stations, the set of precoding matrixes comprising a first precoding matrix for the first signal channel, a second precoding matrix for the second signal channel, a third precoding matrix for the third signal channel and a fourth precoding matrix for the fourth signal channel; and a first generation module configured to generate a second sub-set of a set of precoding matrixes based on the first sub-set of the set of precoding matrixes determined such that the first and second sub-sets satisfy a predetermined condition for interference alignment at the first and second mobile stations, wherein the predetermined consideration of a SNR comprises a consideration of a first SNR at the first mobile station and a second SNR at the second mobile station in determining the first sub-set for optimizing the first sub-set with respect the first SNR at the first mobile station and the second SNR at the second mobile station.

* * * * *